(12) United States Patent
Lin et al.

(10) Patent No.: US 8,067,342 B2
(45) Date of Patent: Nov. 29, 2011

(54) INTERNAL BREAKERS FOR VISCOELASTIC SURFACTANT FLUIDS

(75) Inventors: Lijun Lin, Sugar Land, TX (US);
Leiming Li, Sugar Land, TX (US);
Carlos Abad, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 386 days.

(21) Appl. No.: 12/122,121

(22) Filed: May 16, 2008

(65) Prior Publication Data

US 2008/0269081 A1  Oct. 30, 2008

Related U.S. Application Data

(63) Continuation-in-part of application No. 11/770,313, filed on Jun. 28, 2007, which is a continuation-in-part of application No. 11/532,553, filed on Sep. 18, 2006, now Pat. No. 7,677,311, said application No. 12/122,121 is a continuation-in-part of application No. 11/532,565, filed on Sep. 18, 2006.

(51) Int. Cl.
*C09K 8/68* (2006.01)

(52) U.S. Cl. ........................................ 507/209

(58) Field of Classification Search .................. 166/300, 166/305.1, 308.2; 507/201, 209, 265, 921
See application file for complete search history.

(56) References Cited

U.S. PATENT DOCUMENTS

| | | | |
|---|---|---|---|
| 5,501,275 A | 3/1996 | Card et al. | |
| 5,551,516 A | 9/1996 | Norman et al. | |
| 5,782,300 A | 7/1998 | James et al. | |
| 5,964,295 A | 10/1999 | Brown et al. | |
| 5,979,555 A | 11/1999 | Gadberry et al. | |
| 5,979,557 A | 11/1999 | Card et al. | |
| 6,035,936 A | 3/2000 | Whalen | |
| 6,138,760 A | 10/2000 | Lopez et al. | |
| 6,140,277 A | 10/2000 | Tibbles et al. | |
| 6,258,859 B1 * | 7/2001 | Dahayanake et al. | 516/77 |
| 6,306,800 B1 | 10/2001 | Samuel et al. | |
| 6,399,546 B1 | 6/2002 | Chang et al. | |
| 6,435,277 B1 | 8/2002 | Qu et al. | |
| 6,454,003 B1 * | 9/2002 | Chang et al. | 166/270 |
| 6,509,301 B1 | 1/2003 | Vollmer | |
| 6,605,570 B2 * | 8/2003 | Miller et al. | 507/211 |
| 6,613,720 B1 * | 9/2003 | Feraud et al. | 507/200 |
| 6,617,285 B2 * | 9/2003 | Crews | 507/201 |
| 6,637,517 B2 | 10/2003 | Samuel et al. | |
| 6,667,280 B2 | 12/2003 | Chang et al. | |
| 6,828,280 B2 * | 12/2004 | England et al. | 507/202 |

(Continued)

FOREIGN PATENT DOCUMENTS

GB    2366307    3/2002

(Continued)

*Primary Examiner* — Randy Gulakowski
*Assistant Examiner* — Jeffrey Washville
(74) *Attorney, Agent, or Firm* — Marcin Rzaniak; David Cate; Robin Nava

(57) ABSTRACT

Internal breakers are given that break fluids viscosified with non-polymeric viscosifiers such as viscoelastic surfactants, inside formation pores. The breakers are polyols, for example natural and synthetic sugars, monoalcohols, and mixtures of the two. The sugars may be ketones and aldehydes. The sugars are also breaker aides for oxidizing agents used as breakers. Methods of using the breakers and breaker aides in oilfield treatment fluids are given.

13 Claims, 22 Drawing Sheets

U.S. PATENT DOCUMENTS

| | | | |
|---|---|---|---|
| 6,840,318 B2 | 1/2005 | Lee et al. | |
| 6,881,709 B2 * | 4/2005 | Nelson et al. | 507/203 |
| 7,028,775 B2 | 4/2006 | Fu et al. | |
| 7,052,901 B2 | 5/2006 | Crews | |
| 7,084,093 B2 * | 8/2006 | Crews | 507/209 |
| 7,119,050 B2 * | 10/2006 | Chang et al. | 507/244 |
| 7,160,842 B2 | 1/2007 | Crews | |
| 7,216,704 B2 * | 5/2007 | Hanes et al. | 166/278 |
| 7,219,731 B2 | 5/2007 | Sullivan et al. | |
| 7,287,590 B1 * | 10/2007 | Sullivan et al. | 166/300 |
| 7,347,266 B2 | 3/2008 | Crews et al. | |
| 7,431,087 B2 * | 10/2008 | Sullivan et al. | 166/300 |
| 7,595,284 B2 * | 9/2009 | Crews | 507/239 |
| 2003/0221831 A1 | 12/2003 | Reddy et al. | |
| 2005/0037928 A1 | 2/2005 | Qu et al. | |
| 2005/0121233 A1 | 6/2005 | Frith | |
| 2005/0161220 A1 | 7/2005 | Todd et al. | |
| 2006/0041028 A1 | 2/2006 | Crews | |
| 2006/0211775 A1 | 9/2006 | Crews | |
| 2006/0211776 A1 | 9/2006 | Crews | |
| 2006/0258541 A1 | 11/2006 | Crews | |
| 2006/0272816 A1 | 12/2006 | Willberg et al. | |
| 2007/0056737 A1 | 3/2007 | Crews et al. | |
| 2007/0072776 A1 | 3/2007 | Crews | |
| 2007/0125536 A1 | 6/2007 | Acock et al. | |

FOREIGN PATENT DOCUMENTS

| | | | |
|---|---|---|---|
| GB | 2366307 A * | 3/2002 | |
| GB | 2383809 | 7/2003 | |
| WO | 0211874 | 2/2002 | |
| WO | 02064945 | 8/2002 | |
| WO | 2005121273 | 12/2005 | |
| WO | WO 2005121273 A1 * | 12/2005 | |

* cited by examiner d-glucose    d-sorbitol    d-galactose    d-mannose    d-fructose sucrose    lactose sucralose

INTERNAL BREAKERS FOR VISCOELASTIC SURFACTANT FLUIDS

CROSS-REFERENCE TO RELATED APPLICATIONS

This application is a Continuation-in-Part of prior application Ser. No. 11/770,313, filed Jun. 28, 2007, published as US Patent Application Publication No. US2008/0070806 on Mar. 20, 2008, entitled "Oxidative Internal Breaker System With Breaking Activators for Viscoelastic Surfactant Fluids", hereby incorporated in its entirety, which was a Continuation-in-Part of prior application Ser. No. 11/532,553, filed Sep. 18, 2006, now U.S. Pat. No. 7,677,311 published as US Patent Application Publication No. US 20070032386 on Feb. 8, 2007, entitled "Internal Breaker for Oilfield Treatments," inventors Jesse Lee, Philip Sullivan, Erik Nelson, Yiyan Chen, Carlos Abad, Belgin Baser, and Lijun Lin, hereby incorporated in its entirety. This application is also a Continuation-in-Part of prior copending application Ser. No. 11/532,565, filed Sep. 18, 2006, published as US Patent Application Publication No. 20080070813 on Mar. 20, 2008, entitled "Oxidative Internal Breaker for Viscoelastic Surfactant Fluids," inventors Lijun Lin, Yiyan Chen, Philip F. Sullivan, Belgin Baser, Carlos Abad, and Jesse C. Lee, hereby incorporated in its entirety. This application is also related to copending application Ser. No. 11/532,705, filed Sep. 18, 2006, published as US Patent Application Publication Number US 20080066909, on Mar. 20, 2008, entitled "Method for Limiting Leakoff and Damage in Hydraulic Fractures," inventors Richard Hutchins, Marie Dessinges, and Carlos Abad, hereby incorporated in its entirety. These applications are all assigned to the assignee of the present application.

BACKGROUND OF THE INVENTION

This Invention relates to recovery of oil and gas from wells, and more particularly to breaking fluids inside formation pores when using viscoelastic surfactant based fluid systems (VES's) as carrier fluids and treatment fluids.

There are many applications in which breakers are needed to decrease the viscosity of treatment fluids, such as fracturing, gravel packing, and acidizing fluids, that have been viscosified with polymers, with crosslinked polymers, or with viscoelastic surfactants. Most commonly, these breakers act in fluids that are in gravel packs or fractures; some breakers can work in fluids in formation pores. Breakers decrease viscosity by degrading polymers or crosslinks when the viscosifiers are polymers or crosslinked polymers. Breakers decrease viscosity by degrading surfactants or destroying micelles when viscosifiers are viscoelastic surfactant fluid systems. Most breakers are solids, for example granules or encapsulated materials that do not enter the formation.

There is sometimes a need to break viscous fluids within the pores of formations, for example when viscous fluids enter formations during fracturing, gravel packing, acidizing, matrix dissolution, lost circulation treatments, scale squeezes, and the like. Breakers that are effective inside formations will be called internal breakers here. These fluids that enter the formation may be main treatment fluids (such as fracturing fluids) or they may be secondary fluids (such as flushes or diversion fluids such as viscoelastic diverting acids). Typically it is necessary that the break be delayed, that is that the breaker not act until after the fluid has performed its function.

Compositions and treatment methods using a delayed internal breaker that does not affect the initial properties of the fluid and acts without mechanical or chemical action by the operator, would be of value. It would be desirable to have a number of such materials so that they could be used under different subterranean conditions, for example different temperatures and different formation fluid chemistries.

SUMMARY OF THE INVENTION

A first embodiment of the Invention is a composition containing an aqueous fluid, a surfactant as a viscosifier, and an internal breaker including a monoalcohol and a polyol. The polyol may be 1,3-propanediol or a polyol containing four or more carbon atoms, but is not a sugar aldehyde. The surfactant may include a betaine, for example oleylamidopropyl betaine or erucylamidopropyl betaine. The monoalcohol may have from 1 to 24 carbon atoms, may be linear, branched, or cyclic, and may be saturated or unsaturated, and may be a mixture of such monoalcohols. The monoalcohol may include isopropanol. The polyol may be a sugar alcohol or sugar ketone, for example sorbitol, fructose, sucrose, lactose, dextrose, maltodextrin, sucralose, or a mixture of these. The fluid may be a heavy brine.

Another embodiment of the Invention is a composition including an aqueous fluid, a surfactant as a viscosifier, and an internal breaker that includes a polyol and an oxidizing agent soluble in the fluid. The polyol may be 1,3-propanediol or a polyol containing four or more carbon atoms and is not an aldehyde sugar, a glycol ether, ascorbic acid, or an ascorbate. The surfactant may be a betaine, for example oleylamidopropyl betaine or erucylamidopropyl betaine. The polyol may be a sugar alcohol or sugar ketone, for example sorbitol, fructose, sucrose, lactose, dextrose, maltodextrin, sucralose, or a mixture of these. The composition may be a heavy brine. The composition may also include a monoalcohol that may have from 1 to 24 carbon atoms, may be linear, branched, or cyclic, and may be saturated or unsaturated, or may be a mixture of such alcohols. The monoalcohol may include isopropanol. The oxidizing agent may include a bromate, iodate or persulfate.

Yet another embodiment of the Invention is a composition containing an aqueous fluid, a surfactant as a viscosifier, and an internal breaker that includes a polyol. The polyol may be 1,3-propanediol or a polyol containing four or more carbon atoms, but it is not a glycol ether or a sugar aldehyde. The surfactant comprises a betaine, for example oleylamidopropyl betaine or erucylamidopropyl betaine. The polyol may be a sugar alcohol or sugar ketone, for example sorbitol, fructose, sucrose, lactose, dextrose, maltodextrin, sucralose, or a mixture of these. The fluid may be a heavy brine.

A further embodiment of the Invention is a method of treating a subterranean formation penetrated by a wellbore including the steps of a) injecting into the pores of the formation an aqueous fluid containing a surfactant as viscosifier and an internal breaker including a monoalcohol and a polyol, and b) allowing the fluid to lose viscosity in the pores after the injection. The polyol may be 1,3-propanediol or may be a polyol containing four or more carbon atoms and is not a sugar aldehyde. The surfactant may be a betaine, for example oleylamidopropyl betaine or erucylamidopropyl betaine. The monoalcohol may have from 1 to 24 carbon atoms, may be linear, branched, or cyclic, and may be saturated or unsaturated, and may be a mixture of such monoalcohols. The monoalcohol may be isopropanol. The polyol may be a sugar alcohol or sugar ketone, for example sorbitol, fructose, sucrose, lactose, dextrose, maltodextrin, sucralose, or a mixture of these. The fluid may be a heavy brine.

Another embodiment of the Invention is a method of treating a subterranean formation penetrated by a wellbore including the steps of a) injecting into the pores of the formation an aqueous fluid containing a surfactant as viscosifier and an internal breaker containing a polyol and an oxidizing agent soluble in the fluid, and b) allowing the fluid to lose viscosity in the pores after the injection. The polyol may be 1,3-propanediol or a polyol having four or more carbon atoms, but is not an aldehyde sugar, a glycol ether, ascorbic acid, or an ascorbate. The surfactant may be a betaine, for example oleylamidopropyl betaine or erucylamidopropyl betaine. The polyol may be a sugar alcohol or sugar ketone, for example sorbitol, fructose, sucrose, lactose, dextrose, maltodextrin, sucralose, or a mixture of these. The fluid may be a heavy brine. The fluid may also contain a monoalcohol that can have from 1 to 24 carbon atoms, may be linear, branched, or cyclic, and may be saturated or unsaturated, and may be a mixture of such monoalcohols. A preferred monoalcohol is isopropanol. The oxidizing agent may be a bromate, iodate or persulfate.

Yet another embodiment of the Invention is a method of treating a subterranean formation penetrated by a wellbore including the steps of a) injecting into the pores of the formation an aqueous fluid containing a surfactant as viscosifier and an internal breaker including a polyol, and b) allowing the fluid to lose viscosity in the pores after the injection. The polyol may be 1,3-propanediol or a polyol having four or more carbon atoms, but is not a glycol ether or a sugar aldehyde. The surfactant may be a betaine, for example oleylamidopropyl betaine or erucylamidopropyl betaine. The polyol may be a sugar alcohol or sugar ketone, for example sorbitol, fructose, sucrose, lactose, dextrose, maltodextrin, sucralose, or a mixture of these. The fluid may be a heavy brine.

DETAILED DESCRIPTION OF THE INVENTION

Figure 1:
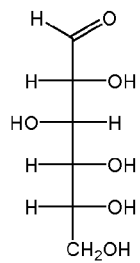
FIG. 1. Chemical structures of sugars used in the study.
Figure 1:
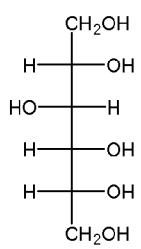
Figure 1:
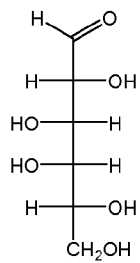
Figure 1:
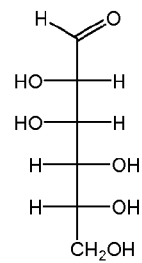
Figure 1:
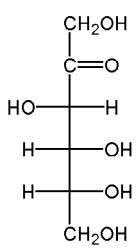
Figure 1:
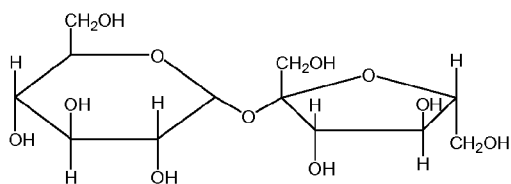
Figure 1:
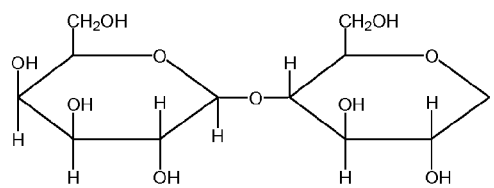
Figure 1:
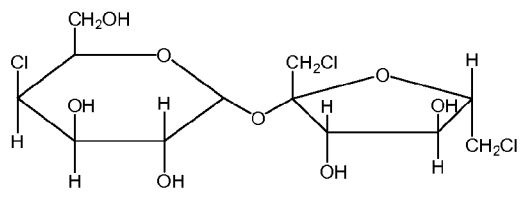

It should be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

For viscosified fluids used in oilfield treatments, it is important that there be a mechanism by which the viscosity can be reduced (that is, the fluid can be broken). Typically, breakers are added to the fluid. Typically, the action of the breaker is delayed or requires a trigger, such as crushing of encapsulated breakers, so that the fluid may perform its function before the break occurs. Proper placement is an important feature for any breaker; it must be with the fluid that is to be broken. Once a fluid invades a formation, most conventional breakers (such as encapsulated oxidizing agents) cannot clean it up because they form or are incorporated in a filter cake and do not enter the formation. An alternative to including the breaker in the fluid, subsequently adding another fluid, such as an acid, will be inefficient because of the poor fluid-to-fluid contact. US Patent Application Publication Number 2008/0070813 disclosed oxidizers as internal breakers for VES fluids and free radical propagating agents, for example reducing sugars, and reducing di-, tri-, oligo- and poly-saccharides as accelerators for the oxidizers. US Patent Application Publication Number 2008/0070806 disclosed the use of aldehydes as internal breakers for VES fluids and as breaker aides for oxidizers used as internal breakers. Two of the aldehydes disclosed were glutaraldehyde and glucose.

Simple monoalcohols and glycols, including low molecular weight glycol ethers, have been used in surfactant concentrates as solvents and as antifreeze. See, for example, PCT Patent Application Nos. WO98/56497 and WO99/32572. Simple monoalcohols and glycols have also been used in viscoelastic surfactant fluids as breakers and as stabilizers (depending upon the exact choices of monoalcohol or glycol, surfactant, concentrations and conditions) (see for example, US Patent Application Publication Nos. 2003/0119680, 2002/0004464, and 2002/0193257, PCT Patent Application Publication No. WO2007/121056, and U.S. Pat. No. 6,929,070). Glycols, especially glycol ethers, especially high molecular weight polyglycol ethers, have been used in viscoelastic surfactant fluids as rheology enhancers (see for example US Patent Application Publication No. 2006/0185842 and U.S. Pat. No. 7,341,980). Note that the glycols reported in all the above examples are the commonly used industrial glycols having hydroxy groups on adjacent carbon atoms, i.e. ethylene glycol and propylene glycol (1,2-propanediol); 1,3-propanediol was not used. Interestingly, sugars are known to delay the action of proteins as breakers for viscoelastic surfactant fluids (see U.S. Pat. No. 7,287,590). Polyols are known to break linear or cross-linked polymer-based viscosified fluids (see US Patent Application Publication No. US2007/0072776). Aldehydes, including sugar aldehydes can be breakers for viscoelastic surfactant fluids and breaker aides for oxidizing agents used as breakers for viscoelastic surfactant fluids (see US Patent Application No. 2008/0070806).

However polyols in general, including glycerols, aldehydes and ketones and sugars that are polyols, alone or in combination with monoalcohols, have now been found to be breakers for viscoelastic surfactant fluids and breaker aides for oxidizing agents used as breakers for viscoelastic surfactant fluids. These polyol systems are particularly suitable as internal breakers for VES based fluids and as breaker aides to accelerate the action of oxidizers used as internal breakers. These polyols, or polyols and alcohols, will be referred to as the "polyols and alcohols of the Invention". These polyols, or polyols and alcohols, with or without oxidizing agents will be referred to as "breaker systems" of the Invention. Although the discussion will be in terms of internal breakers, it should be understood that the composition and method of the Invention may also be used in wellbores, for example in kill pills or gravel packs, and in fractures, for example in proppant packs. Since the "internal breakers" of the Invention are soluble in the treatment fluids in which they are used, any internal breaker of the Invention that does not enter the formation, either intentionally or unintentionally, will break the fluid where it finishes up at the end of the treatment, for example in a gravel pack, filter cake, or proppant pack, The Invention will be described primarily in terms of hydraulic fracturing, gravel packing, acidizing, and fracture acidizing, although it is to be understood that the Invention may be used in many other ways, for example for many other oilfield treatments. The wellbores treated can be vertical, deviated or horizontal. They can be completed with casing and perforations or open hole. In hydraulic fracturing, most of the injected fracturing fluid contains a proppant such as sand or synthetic ceramic beads, so that when the pressure is released the proppant is trapped between the fracture faces and prevents the fracture from completely closing, thus leaving a flowpath open. The injected fracturing fluid is normally viscosified to provide fracture width and to support the proppant. Increased viscosity results in formation of a wider fracture, thus a larger flowpath. A minimal viscosity is also required to transport adequate amounts of proppant; the actual viscosity required depends primarily upon the fluid flow rate, the elasticity of the fluid, and the density of the proppant. In a typical fracturing process, such as hydraulic fracturing with aqueous fluids, the fracture is initiated by first pumping a high viscosity fluid with good to moderate leak-off properties, and typically no proppant, into the formation. This initial fluid, typically referred to as a "pad", is usually followed by a second fluid (fracturing fluid) of similar viscosity carrying an initially low concentration and then a gradually or step-wise increasing concentration of proppant into the extended fracture or fractures. The pad initiates and propagates the fracture but does not need to carry proppant. All the fluids tend to "leak off" into the formation from the fracture being created or extended. Commonly, by design, by the end of the job the entire volume of the pad will have leaked off into the formation. This leak-off is determined and controlled primarily by the properties of the fluid (and additives it may contain, such as fluid loss additives or FLA's), the pumping rate and pressure, and the properties of the rock. A certain amount of leak-off greater than the minimal possible may be desirable, for example a) if the intention is to place some fluid in the rock to change the rock properties or to flow back into the fracture during closure, or b) if the intention is deliberately to cause what is called a "tip screen-out", or "TSO", a condition in which the proppant forms a bridge at the some point in the fracture, stopping the lengthening of the fracture and resulting in a subsequent increase in the fracture width. In acid fracturing, the fracture fluid is an acid (or other formation dissolving fluid such as a chelant-containing fluid) and the fluid normally does not contain proppant (although it may); the fracture is held open by asperities in the fracture faces caused by differential etching of the formation material. In matrix acidizing, an acid or other formation dissolving fluid is injected below fracture pressure and the fluid enters the formation and dissolves damaging materials and/or a portion of the formation. Proper leak-off control may be critical to the success of these and other oilfield treatments. In these and many other treatment types with viscous fluids, after the treatment it is necessary to decrease the viscosity of the fluids, i.e. to break them, including breaking any portion of the fluid that may be in the pores of the formation. The break must be delayed until after the treatment; preferably all the fluid breaks no matter where it is. A "controlled delayed break" means that the fluid breaks when and where the operator desires.

We have found that certain materials and combinations of materials (the polyols and alcohols of the Invention, optionally with oxidizing agents) may be used as delayed internal breakers; when the fluid is properly formulated for the conditions, a controlled delayed break may occur naturally due to naturally changing chemical or physical conditions, for example temperature or pH. The break may optionally be accelerated or delayed if necessary. The break may also optionally be triggered by contact with another fluid, such as another injected fluid, a formation fluid, or a produced fluid. Injecting another fluid to promote the break is not normally desirable because of potential costs and complexity, but is within the scope of the Invention. All of the polyols and alcohols of the Invention are breakers for polymer-free (VES) fluid viscosifiers. The internal breaking effect occurs whether or not a filter cake is also formed by the addition of a fluid loss additive or by other (solid) breakers, such as encapsulated breakers. Of course, when an oxidizing agent is included, for the breaker to be an internal breaker the oxidizing agent must be soluble in the fluid.

Previous work, described in US Patent Application No. 20080070806, had shown that aldehydes can be breakers for VES's and breaker aides for oxidizing agents used as breakers for VES's. Two weight % glucose was shown to accelerate the breaking by 1 weight % sodium bromate of a gel made with 6 volume % BET-E-40 (see below) in 2% KCl at 225° F. (107.2° C.). In the absence of the oxidizer, "a small amount of viscosity loss occurred under the same test conditions". It was thought at the time that the equivalent sugar ketone, fructose for example, would not be an efficient breaker aide due to the less active nature of ketones generally observed in many chemical reactions. It was also thought that sugar alcohols like sorbitol would have little effect on the breaking since they are typically even much less active than ketones.

Particularly suitable polyols for use in the breaker systems of the Invention are sugar alcohols, and sugar ketones; natural and synthetic sugars may be used. Typical sugar alcohols, aldehydes, and ketones used to examine how these functionalities may be used are shown in FIG. 1. Among these, glucose, galactose and mannose are all sugar aldehydes and are diastereoisomers of each other. Sorbitol is a representative sugar alcohol; fructose has a ketone functional group instead of an aldehyde. Representative disaccharides include sucrose and lactose. A representative synthetic sugar is sucralose, made by chlorinating sucrose, for example the artificial sweetener sold under the trade name SPLENDA™ (McNeil Nutritionals, LLC. Fort Washington, Pa.). That product contains mostly maltodextrin and dextrose as filler; experiments showed that the "filler" and chemically pure sucralose were each active.

A controlled break of VES fluids can be achieved with using any of the sugars of FIG. 1 alone at elevated temperatures. Sugars have been found to be particularly effective breakers in calcium based heavy brines. Addition of an oxidizer, such as sodium bromate, further helps break down the fluid viscosity. Sugar alcohols, ketones, aldehydes and other polyols all act as accelerators for the bromate salt, with the sugar and non-sugar polyols tending to be less active than sugar ketones and aldehydes. Surprisingly, ketone sugars tend to be faster breakers or better activators than the aldehyde analogs. In addition to natural sugars, synthetic sugars such as sucralose exhibit similar effects when used alone or as an aide to sodium bromate. Excellent breaking is also achievable by using readily available artificial sweetener packages which mainly consist of filler materials.

Non-sugar polyols tested are not breakers, but they do act as breaker aides in the presence of oxidizing agents, for example sodium bromate. Non-sugar polyols, or mixtures of non-sugar alcohols, with an oxidizer, and sugar alcohols, aldehydes, and ketones, or mixtures of these materials, with or without an oxidizer, may be used alone or in combination with a monoalcohol.

Non-limiting examples of other suitable polyols are glycerol, sorbitol, mannitol, pentaerythritol, maltitol, polyols derived by hydrogenation of natural sugars, and oligopolymers containing multiple alcohol groups such as oligovinylalcohols.

Suitable monoalcohols include, by non-limiting example, methanol, ethanol, 1-propanol, 2-propanol (isopropanol), allyl alcohol (2-propen-1-ol), 1-butanol, 2-butanol, t-butanol (2-methyl-2-propanol), 1-pentanol, 2-pentanol, 3-pentanol, and other saturated and unsaturated linear and branched hydrocarbon primary, secondary and tertiary alcohols having the general formula $C_nH_{(2(n-x)+1)}OH$, where n, the carbon chain length, is between 1 and 24, preferably between 1 and 16, most preferably between 1 and 12, for example between 1 and 8, and where x, the number of unsaturations (where the term unsaturation is to include double bonds, triple bonds (which each count as two x's), and rings) is between 0 and 24. The number of unsaturations x can not exceed the number of carbon atoms n. It is believed that the use of the longer chain alcohols is more suitable when the time the fluid is to remain stable is short, whereas the use of shorter chain length alcohols is more suitable when the fluid is to remain stable for longer periods of time.

Interestingly, at short times at least some of the polyols of the Invention appeared to stabilize the VES fluids, but at longer times it became apparent that they were breakers and/or breaker aides. This early stabilization effect is an additional benefit of the breakers, breaker aides, and methods of the Invention.

The Invention is particularly suited for use with polymer free fluids. The Invention is especially useful in gravel packing and the like, where near-wellbore damage can be a problem. The Invention makes it possible to treat wells previously eliminated as candidates for various treatments due to the low fluid efficiency (high leak-off) that would have been expected. The internal breakers may be used as an alternative to some or all of the fluid loss additives that would have been used, especially when filter cakes are undesirable; instead of minimizing fluid loss, the fluid loss may be accepted and the leaked-off fluid broken. Viscosified fluids containing internal breakers may also function as self-destructing diverting agents. They may also be used in kill pills, which can be difficult to break because mechanisms often available for breaking (such as crushing of encapsulated materials, or later addition of another component) cannot usually be used with kill pills.

In treatments that typically include multiple stages, such as most hydraulic fracturing, acid fracturing, frac-packing, and gravel packing embodiments, the internal breaker may be added in the pad, throughout the treatment or to some of the stages only, for example some of the proppant, gravel, acid, or diversion stages. An internal breaker is particularly useful in hydraulic fracturing, frac-packing, and gravel packing because mechanical removal methods are impossible and methods involving contacting the additive with an additional fluid are not always practical. The compositions and methods of the Invention are also particularly useful in cases where it is desirable to allow a certain amount of treatment fluid to enter the formation, for example for the purpose of altering formation wettability or oil or water saturation.

Treatment fluids used with the compositions and methods of the Invention typically also contain other materials such as demulsifiers, corrosion inhibitors, friction reducers, clay stabilizers, scale inhibitors, biocides, breaker aides, mutual solvents, surfactants, anti-foam agents, defoamers, viscosity stabilizers, iron control agents, diverters, emulsifiers, foamers, oxygen scavengers, pH control agents, buffers, and the like. Compatibility of the internal breakers of the Invention with such additives should be checked in the laboratory. The treatments of the Invention are conducted normally; the treatment fluid and additives are transported to the site, mixed (batch-mixed or mixed on the fly), stored, and pumped in the usual ways for the respective chemicals. When Resin Coated Proppants (RCP's) are used, testing should be done to ensure that the RCP's and internal breakers of the invention are compatible and that neither interferes with the performance of the other; conventional natural and synthetic proppants and gravels may normally be used without testing.

In some cases, a certain amount of leak-off is desired, for example so that a tip screen-out occurs in fracturing, a condition in which the proppant forms a bridge, preferably at or near the end of the fracture away from the wellbore, stopping the lengthening of the fracture and resulting in a subsequent increase in the fracture width as slurry injection continues. For example, hydraulic fracturing followed by gravel-packing in a single operation, sometimes called a frac-pac, frac-pac, frac pac, frac and pac, or StimPac, sometimes with a deliberate tip screen-out to generate a short wide fracture, is usually performed in relatively high permeability formations for sand-control purposes. However, such operations are sometimes performed in low permeability formations, occasionally for sand control, but also for other reasons, for example to bypass permeability damage near the wellbore caused by scaling or to improve upon poor communication between the wellbore and the formation or a previous fracture, or in formations in which perforating creates damaging fines, or for other reasons. Such jobs designed to generate short wide fractures may also be performed without subsequent gravel-packing when sand control is not an issue. The methods of the present Invention can be used in any of these cases (fracturing followed by gravel packing and/or fracturing for short wide fractures, in either case with or without deliberate tip screen-out).

Although in conventional propped fracturing the most common way to control fluid loss is to build an impermeable or reduced-permeability filtercake on the fracture walls (faces), in acid fracturing, especially with a low viscosity ungelled acid, pad viscosity is important for fluid loss control. On the other hand, if the acid is viscosified with a VES system, then if the VES has higher low-shear viscosity than high-shear viscosity, which is common, then as the VES leaks off a short distance into the formation, the flow rate decreases, the shear rate therefore decreases, and the fluid becomes more viscous. Such effects can reduce low viscosity ungelled or weakly gelled acid leak-off better than a wallbuilding system that dissolves or decomposes in acid. In these cases, an internal breaker would be particularly suitable in the pad. This allows acid treatment a certain selected depth into the formation and the acid then performs the very desirable function of diverting subsequent acid, after which it is particularly important that the VES system then be broken, or flow of fluids will continue to be restricted. Similarly, some internal breakers may be used with viscoelastic diverting acids, which are acids containing certain viscoelastic surfactants, such that the fluid has low viscosity as formulated and injected, but increases in viscosity as the acid reacts with the formation, such as a carbonate. Examples of such viscoelastic diverting acid systems were described in U.S. Pat. Nos. 6,399,546, 6,667,280, and 7,028,775 and 7,119,050, all hereby incorporated by reference.

Sometimes acid fracturing is performed with a series of alternating pad, acid, pad, acid, etc. stages in order to optimize coverage. The first, usually but not always non-acidic, pad initiates a fracture for the first acid stage to follow. That first acid stage etches a portion of the fracture face. Subsequent stages of pad and acid repeat the process until the designed treatment volumes have been injected and the desired fracture has been created. In the past, this process has always used a gelled pad, such as one containing a viscoelastic surfactant system, and has usually but not always used an ungelled acid. The internal breaker systems of the Invention may be used in at least the first pad and sometimes in all the pad stages, and in any gelled VES acid stages. Similarly, matrix acidizing may be performed with alternating stages of acid and another fluid, such as a diverter, some or all of which may be viscosified; the internal breaker systems of the Invention may be included in some or all of either the acid or the other fluid to break a VES viscosifier. It should be noted that the internal breakers of the Invention may be used for breaking foams and energized fluids as well as straight fluids.

The acid used in the matrix acidizing and acid fracturing methods of this Invention can be any acid used in acid fracturing, including gelled, self-diverting, and delayed acids. Commonly used, but not limiting, acids are hydrochloric, hydrofluoric, fluoboric, acetic, and formic acids and mixtures thereof, and those acids in the form of oil external emulsions (for reaction rate retardation), or oil internal emulsions (for hydrocarbon solvency). The acids can contain additives such as corrosion inhibitors and chelants used to help dissolve rock components and keep them in solution. Gelled, self-diverting, and delayed acids can be gelled with suitable VES's. Some internal breakers of the Invention, in particular when the internal breaker is a polyol or alcohol used as a breaker aide with an oxidizing agent, may not be compatible with acid, or with strong acid, and laboratory tests should be performed to determine compatibility.

The Invention is carried out by considering information about the well, the formation, the fluids and additives available, and criteria for a successful treatment, and preparing an optimized plan for maximizing treatment performance according to the data and the criteria. This is usually done by analyzing the well using treatment design and evaluation software; for example, in hydraulic fracturing software, among other factors, pressure gradients are combined with fracture length and height evolution algorithms, complete leak-off information, and the effects of multiple fluid injections and their temperature changes.

The optimal concentration of the internal breaker of the Invention, the polyol, optionally plus alcohol, and optionally the oxidizing agent, can be determined by choosing the desired breaking time and rate and measuring the break with samples of the intended fluids under the intended formation conditions. Measurement of breaking, and prediction and control of breaking, are familiar to those of ordinary skill in the arts of well stimulation, sand control, and other oilfield treatments. A suitable concentration of the internal breaker of the Invention is from about 0.05 weight % (of polyol or alcohol component) to about 10 weight %, for example from about 0.25 weight % (of polyol or alcohol component) to about 5 weight %, for example from about 0.5 weight % (of polyol or alcohol component) to about 2.5 weight %. Suitable concentrations of oxidizing agents are known; when the polyols and alcohols of the Invention are used as breaker aides, lower concentrations of the oxidizing agents than would otherwise have been used may optionally be used.

If fluid loss additives are used, it is preferable, although not necessary, to use completely degradable fluid loss additives. Particularly desirable FLA's would be the "internal filter cake/matrix breaker" materials disclosed in US Patent Application Publication No. US 20070032386. When the pad and the fracture fluid are polymer-free and any fluid loss additive used is fully degradable, neither the near-wellbore formation nor the proppant bed left in the fracture after the job contains deleterious polymers or solids, as would be the case if the fracture fluid contained any polymer or if the fluid loss additive was not fully degradable. Therefore fracture conductivity is high and skin is low. Similar arguments hold for other treatments such as gravel packing, acidizing and acid fracturing.

Any non-polymeric fluid, for example VES based fluid, that is compatible with the formation, the formation fluids, and the other components of the fluid, can be used in the Invention. Particularly effective non-limiting examples of fluids are those described in U.S. Pat. Nos. 5,551,516; 5,964, 295; 5,979,555; 5,979,557; 6,140,277; and 6,258,859, all hereby incorporated by reference. Vesicle-based fluids may be used, such as those described in U.S. Pat. No. 6,509,301, hereby incorporated by reference.

The breaker systems of the Invention have been found to work particularly well in heavy brines, for example calcium chloride, calcium bromide, zinc bromide, sodium bromide, cesium bromide, cesium formate and mixtures thereof, and mixtures of heavy and light synthetic brines. They are typically somewhat less effective, but still useful, in light synthetic brines and fresh water, including tetramethyl ammonium chloride brines, sodium chloride, potassium chloride, synthetic seawater and mixtures thereof. They will work in seawater. Most viscoelastic surfactants require some electrolyte in the system for them to gel.

Suitable oxidizing agents include peroxysulfuric acid; persulfates such as ammonium persulfate, sodium persulfate, and potassium persulfate; peroxides such as hydrogen peroxide, t-butylhydroperoxide, methyl ethyl ketone peroxide, cumene hydroperoxide, benzoyl peroxide, acetone peroxide, methyl ethyl ketone peroxide, 2,2-bis(tert-butylperoxy)butane, pinane hydroperoxide, bis[1-(tert-butylperoxy)-1-methylethyl]benzene, 2,5-bis(tert-butylperoxy)-2,5-dimethylhexane, tert-butyl peroxide, tert-butyl peroxybenzoate, lauroyl peroxide, and dicumyl peroxide; bromates such as sodium bromate and potassium bromate; iodates such as sodium iodate and potassium iodate; periodates such as sodium periodate and potassium periodate; permanganates such as potassium permanganate; chlorites such as sodium chlorite; hyperchlorites such as sodium hyperchlorite; peresters such as tert-butyl peracetate; peracids such as peracetic acid; azo compounds such as azobisisobutyronitrile (AIBN), 2,2'-azobis(2-methylpropionitrile), 1,1'-azobis(cyclohexanecarbonitrile), 4,4'-azobis(4-cyanovaleric acid), and, for example, those sold under the VAZO trade mark by DuPont such as Vazo®52, Vazo® 64, Vazo® 67, Vazo® 88, Vazo® 56 WSP, Vazo® 56 WSW, and Vazo® 68 WSP; perborates such as sodium perborate; percarbonates; and perphosphates.

Bromates, for example sodium bromate, are particularly useful oxidizing agents because they are not very active. Common VES gels are often quite stable in the presence of bromates at low temperatures, for example up to about 200° F. (about 93° C.). At higher temperatures, bromates begin to act as breakers. The breaking time may be controlled by selection of the amount and type of polyol or alcohol of the Invention to be added to the fluid. Useful amounts of polyol or alcohol (breaking activator) depend upon the choice and concentration of VES, the possible presence of rheology stabilizers, the specific activator selected, and the specific oxidizing agent. Time of break is generally reduced at higher percentages of activator. Temperatures also affect the time required for a complete break. One skilled in the art can, by review of the examples below and reasonable experimentation, determine what ranges are useful for the time of break desired in the operational temperature range for a given system.

In more general terms, the choice and concentration of internal breaker system (polyol or alcohol plus optional oxidizer) is based primarily on the desired time before the delayed break, which will depend upon the choice and concentration of VES and the temperature, and upon the size of the job, the nature of the job, and other factors as mentioned above and known to those of ordinary skill in the art. Suitable choices and concentrations may be determined by simple laboratory experiments, for example by mixing all the components, heating to the job temperature, and monitoring the viscosity.

The internal breaker systems of this Invention may be used with VES's made with any type of surfactant, or mixtures of surfactants, with or without one or more co-surfactants, and with or without other additives intended to stabilize or modify the properties of the micelles or vesicles (such as buffers, shear recovery additives, salts, and rheology boosters). Preferred VES's are cationic, anionic, amphoteric, and zwitterionic. Suitable VES's, for example, are described in the following U.S. patents, all of which are hereby incorporated in their entirety: U.S. Pat. Nos. 5,964,295; 5,979,557; 6,306, 800; 6,637,517; and 6,258,859. The viscoelastic surfactant may be, for example, of the following formulae: R-Z, where R is the hydrophobic tail of the surfactant, which is a fully or partially saturated, linear, branched or alycyclic hydrocarbon chain of at least 14 carbon atoms and Z is the head group of the surfactant which may be for example —$NR_1R_2O$ (amphoteric), —$NR_1R_2R_3^+$ (cationic), —$SO_3^-$, —COO— (anionic) or, in the case where the surfactant is zwitterionic, —$N^+(R_1)(R_2)R_3$—$COO^-$ (betaine) or —$N^+(R_1)(R_2)R_3$—$SO_3^-$ (sultaine), where $R_1$, $R_2$ and $R_3$ are each independently hydrogen or a fully or partially saturated, linear or branched, aliphatic chain of at least one carbon atom; and where $R_1$ or $R_2$ may comprise a hydroxyl terminal group.

A nonlimiting example of a suitable cationic viscoelastic surfactant useful for the implementation of the Invention is N-erucyl-N,N-bis(2-hydroxyethyl)-N-methyl ammonium chloride. Nonlimiting examples of some suitable anionic viscoelastic surfactants useful for the implementation of the Invention are monocarboxylates $RCOO^-$ such as oleate where R is $C_{17}H_{33}$ or di- or oligomeric carboxylates such as those disclosed in International Patent Application WO 02/11874.

The internal breaker systems and methods of this Invention have been found to be particularly useful breakers when used with several types of zwitterionic surfactants. In general, suitable zwitterionic surfactants have the formula:

RCONH—$(CH_2)_a(CH_2CH_2O)_m(CH_2)_b$—$N^+(CH_3)_2$—$(CH_2)_{a'}(CH_2CH_2O)_{m'}(CH_2)_{b'}COO^-$ in which R is an alkyl group that contains from about 11 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to about 10 if m is 0; a' and b' are each 1 or 2 when m' is not 0 and (a'+b') is from 1 to about 5 if m is 0; (m+m') is from 0 to about 14; and $CH_2CH_2O$ may also be oriented as $OCH_2CH_2$. Preferred surfactants are betaines and amidoamine oxides.

Preferred zwitterionic surfactants include betaines. Betaine surfactants, and others that are suitable, are described in U.S. Pat. No. 6,258,859. Two suitable examples of betaines are BET-O and BET-E. The surfactant in BET-O-30 is oleylamidopropyl betaine. It is designated BET-O-30 because as obtained from the supplier (Rhodia, Inc. Cranbury, N.J., U.S.A.) it is called Mirataine BET-O-30 because it contains an oleyl acid amide group (including a $C_{17}H_{33}$ alkene tail group) and contains about 30% active surfactant; the remainder is substantially water, sodium chloride, and propylene glycol (1,2-propanediol). An analogous material, BET-E-40, is also available from Rhodia and contains an erucic acid amide group (including a $C_{21}H_{41}$ alkene tail group) and is approximately 40% active ingredient, with the remainder being substantially water (about 32%), sodium chloride (about 5%), and isopropanol (about 23%). VES systems, in particular BET-E-40, optionally contain about 1 weight % of a condensation product of a naphthalene sulfonic acid, for example sodium polynaphthalene sulfonate (PNS), as a rheology modifier, as described in U.S. Pat. No. 7,084,095. The surfactant in BET-E-40 is shown below; one chemical name is erucylamidopropyl betaine. As-received concentrates of BET-E-40 were used in the experiments reported below.

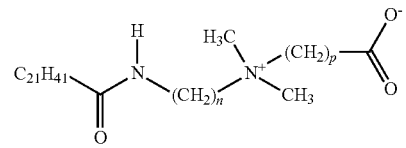

Surfactant in BET-E-40 (when n = 3 and p = 1)

Although the Invention has been described throughout using the term "VES", or "viscoelastic surfactant" to describe the non-polymeric viscosified aqueous fluid, any non-polymeric material may be used to viscosify the aqueous fluid provided that the requirements described herein for such a fluid are met, for example the required viscosity, stability, compatibility, and lack of damage to the wellbore, formation or fracture face. Examples, without regard to whether they form, or are described as forming, vesicles or viscoelastic fluids, include, but are not limited to, those viscosifiers described in U.S. Pat. No. 6,035,936 and in GB application No. 2,366,307A.

Also optionally, fracturing fluids may contain materials designed to assist in proppant transport and/or to limit proppant flowback after the fracturing operation is complete by forming a porous pack in the fracture zone. Such materials can be any known in the art, such as are available from Schlumberger under the tradename PropNET™ (for example see U.S. Pat. No. 5,501,275). Exemplary proppant flowback inhibitors include fibers or platelets of novoloid or novoloid-type polymers (U.S. Pat. No. 5,782,300).

In gravel packing, or combined fracturing and gravel packing, it is within the scope of the Invention to apply the compositions and methods of the Invention to treatments that are done with or without a screen. Although treatments are normally done to promote hydrocarbon production, it is within the scope of the Invention to use the compositions and methods of the Invention in wells intended for the production of other fluids such as carbon dioxide, water or brine, or in injection wells. Although we have described the Invention in terms of unfoamed fluids, fluids foamed or energized (for example with nitrogen or carbon dioxide or mixtures thereof) may be used. Adjustment of the appropriate concentrations due to any changes in the fluid properties (or other parameters, such as proppant concentration) consequent to foaming would be made.

The internal breakers of the Invention may also be used in other industries such as household and industrial cleaning.

A particular advantage of many the internal breakers of the Invention is that they and their degradation products are generally not toxic to humans and aquatic animals and are typically biodegradable.

The present invention can be further understood from the following examples.

EXPERIMENTAL

The VES fluids for all experiments described below were made with betaine surfactant BET-E-40, provided by Rhodia, Inc. Cranbury, N.J., U.S.A. BET-E-40 contains approximately 38 wt % of erucic amidopropyl dimethyl betaine as the active ingredient and about 23% isopropanol. SPLENDA™ was made by McNeil Nutritionals, LLC. Fort Washington, Pa., U.S.A. Sucralose was obtained from Forbest International USA, LLC. Edison, New Jersey. The following chemicals were purchased from Sigma-Aldrich, Saint Louis, Mo., U.S.A.: d-glucose, d-sorbitol, d-galactose, d-mannose, d-fructose, sucrose, lactose (β form minimum 30%), glycerol, ethylene glycol, propylene glycol (1,2-propanediol), 1,3-propanediol, and sodium bromate.

Figure 37:
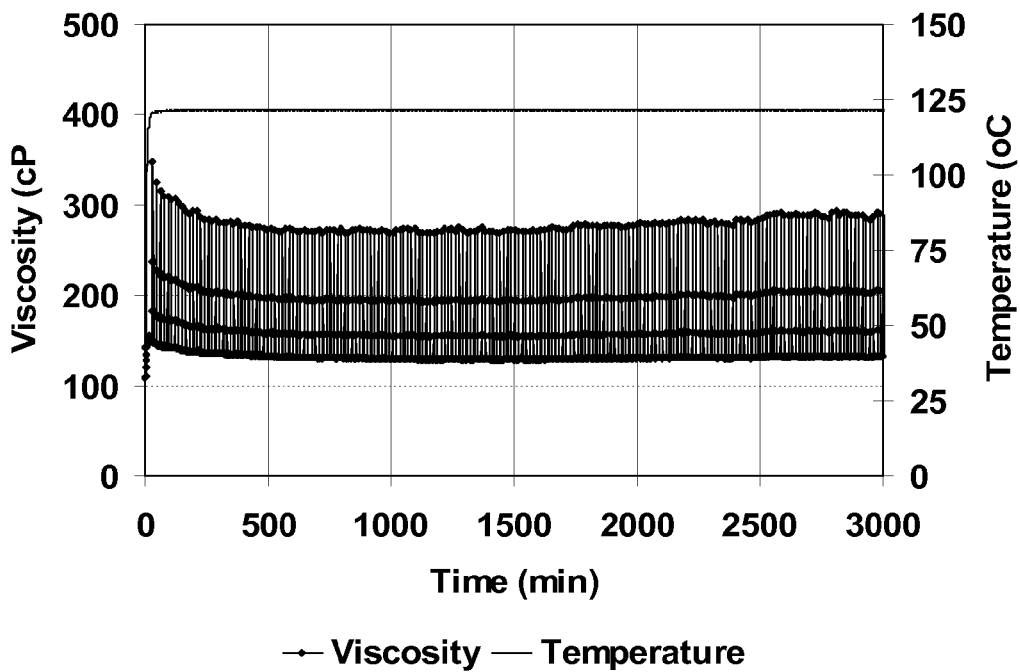
FIG. 37. Viscosity as a function of time for a VES fluid containing 6 volume % BET-E-40 and 2 weight % KCl at 250° F. (121.1° C.).
Figure 38:
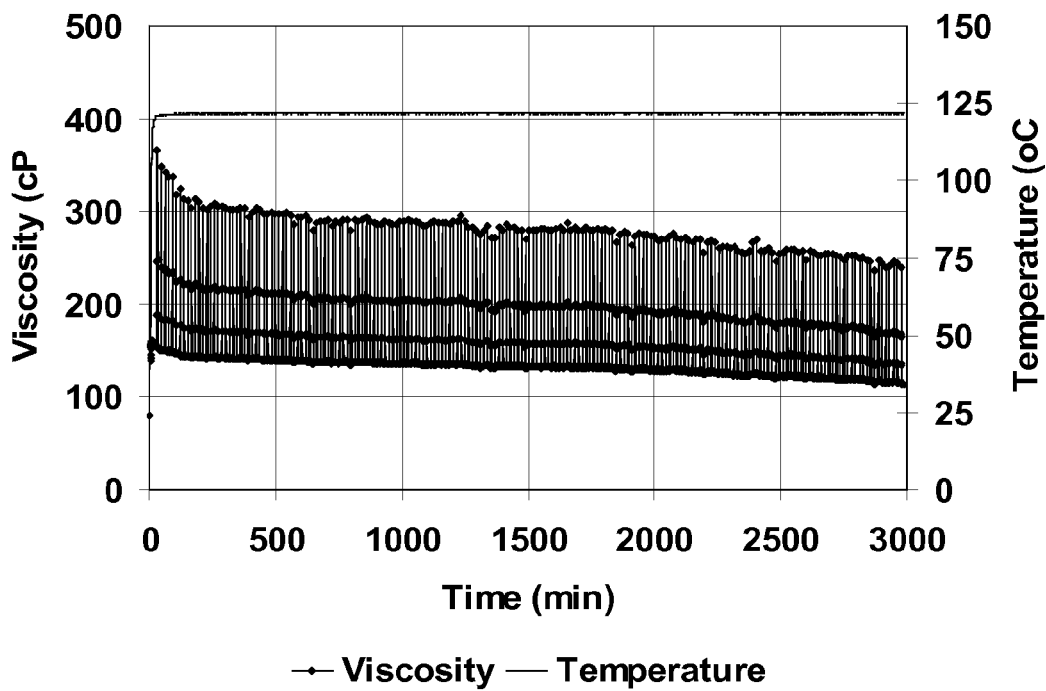
FIG. 38. Viscosity as a function of time for a VES fluid containing 6 volume % BET-E-40, 1 weight % sodium bromate, and 2 weight % KCl at 250° F. (121.1° C.).

The viscosities of the sample solutions were measured as a function of time and temperature on Fann 50 viscometers. A standard procedure was used for the Fann 50 measurements, in which the viscosity was measured at a shear rate of $100\ s^{-1}$ with ramps down to $75\ s^{-1}$, $50\ s^{-1}$ and $25\ s^{-1}$ every 15 min. A heating time of 15 to 30 minutes was necessary for the fluids to reach the test temperatures, so that the early portions of the data reflect heating to the final temperature. The instrument sometimes showed small regular fluctuations around the intended temperature, so small oscillations in the observed viscosities in some figures reflects that occurrence. A control experiment with no oxidizer and no polyol is shown in FIG. 37, and a control experiment with sodium bromate alone is shown in FIG. 38.

Example 1

Sugars Alone as Breakers for VES Fluids in Heavy Brines

Experiments were done with d-glucose, d-sorbitol, d-galactose, d-mannose, d-fructose, sucrose, lactose (a minimum of 30% in the β form), SPLENDA™ and sucralose, each in calcium chloride brine. Glucose and fructose were also examined in calcium bromide and sodium bromide brines, which are also commonly used in gravel pack treatments.

Figure 2:
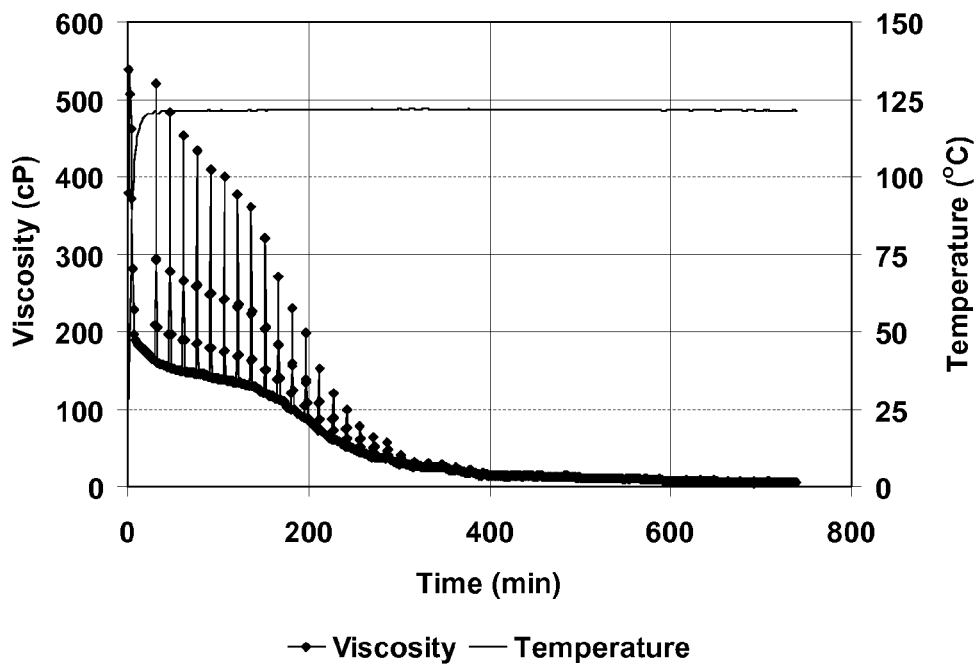
FIG. 2. Viscosity as a function of time for a VES fluid containing 6 volume % BET-E-40 and 2 weight % glucose in 1.39 g/mL (11.6 ppg) $CaCl_2$ at 250° F. (121.1° C.).
Figure 3:
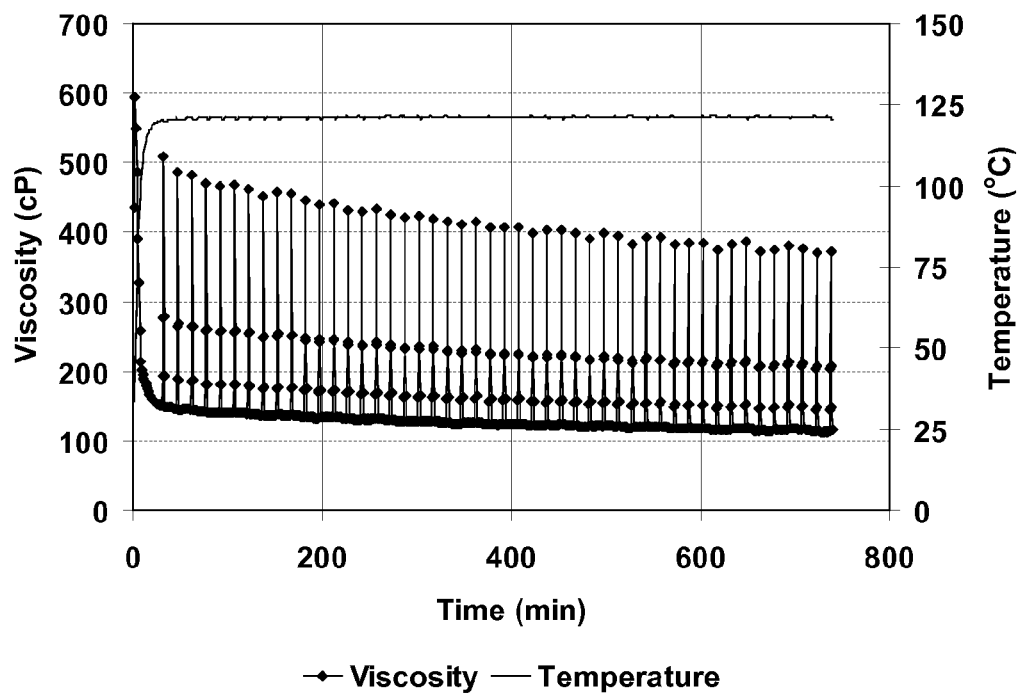
FIG. 3. Viscosity as a function of time for a VES fluid containing 6 volume % BET-E-40 and 2 weight % sorbitol in 1.39 g/mL (11.6 ppg) $CaCl_2$ at 250° F. (121.1° C.).
Figure 4:
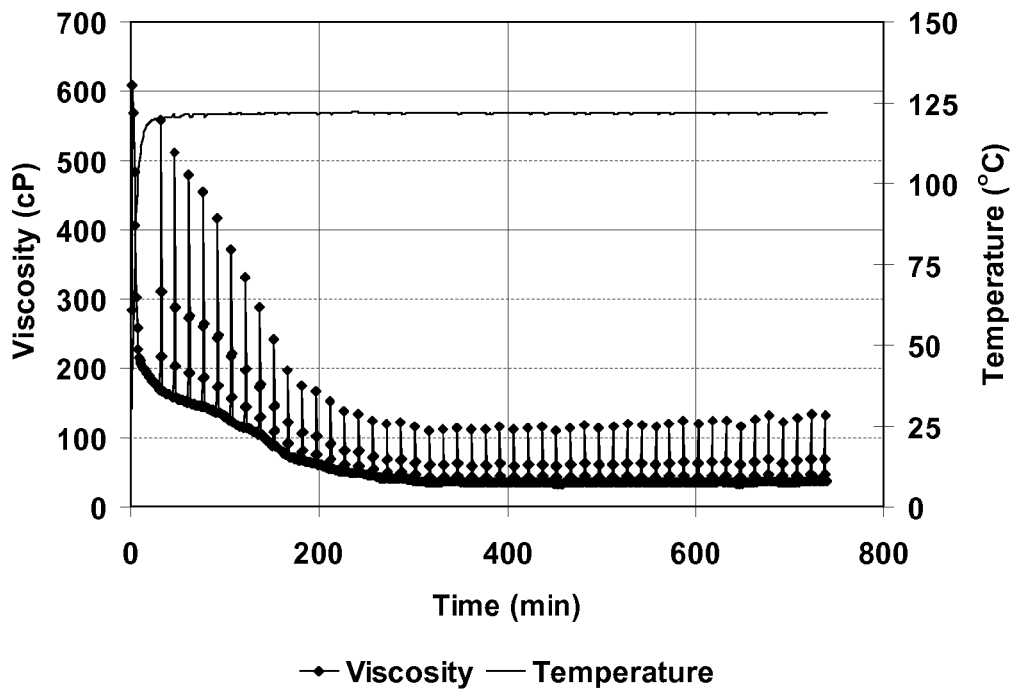
FIG. 4. Viscosity as a function of time for a VES fluid containing 6 volume % BET-E-40 and 2 weight % galactose in 1.39 g/mL (11.6 ppg) $CaCl_2$ at 250° F. (121.1° C.).
Figure 5:
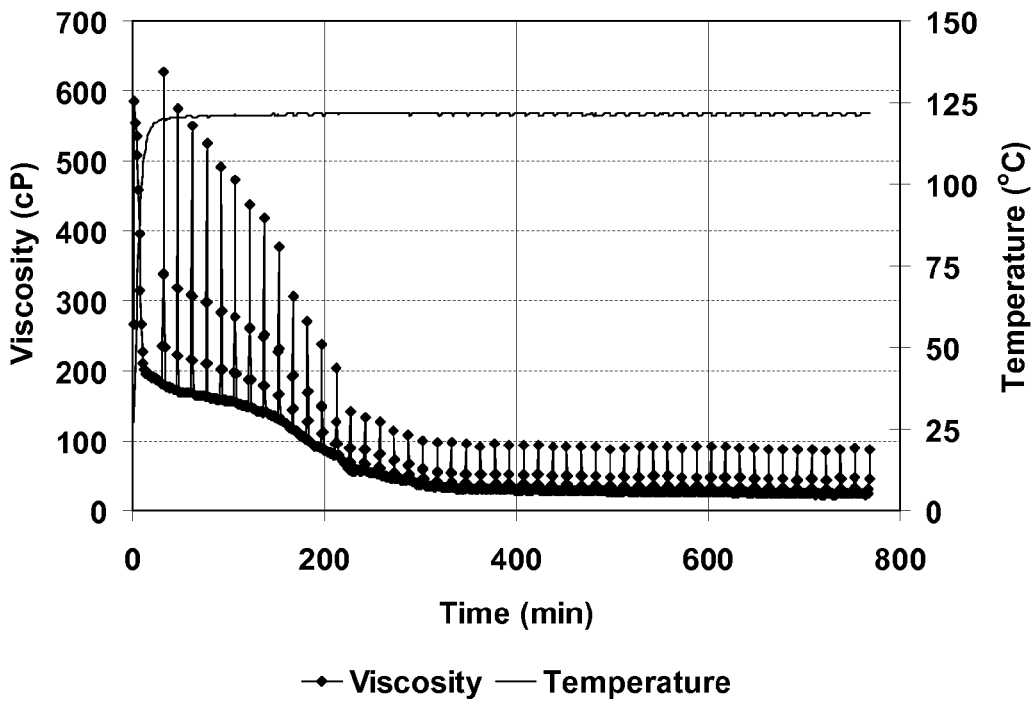
FIG. 5. Viscosity as a function of time for a VES fluid containing 6 volume % BET-E-40 and 2 weight % mannose in 1.39 g/mL (11.6 ppg) $CaCl_2$ at 250° F. (121.1° C.).
Figure 6:
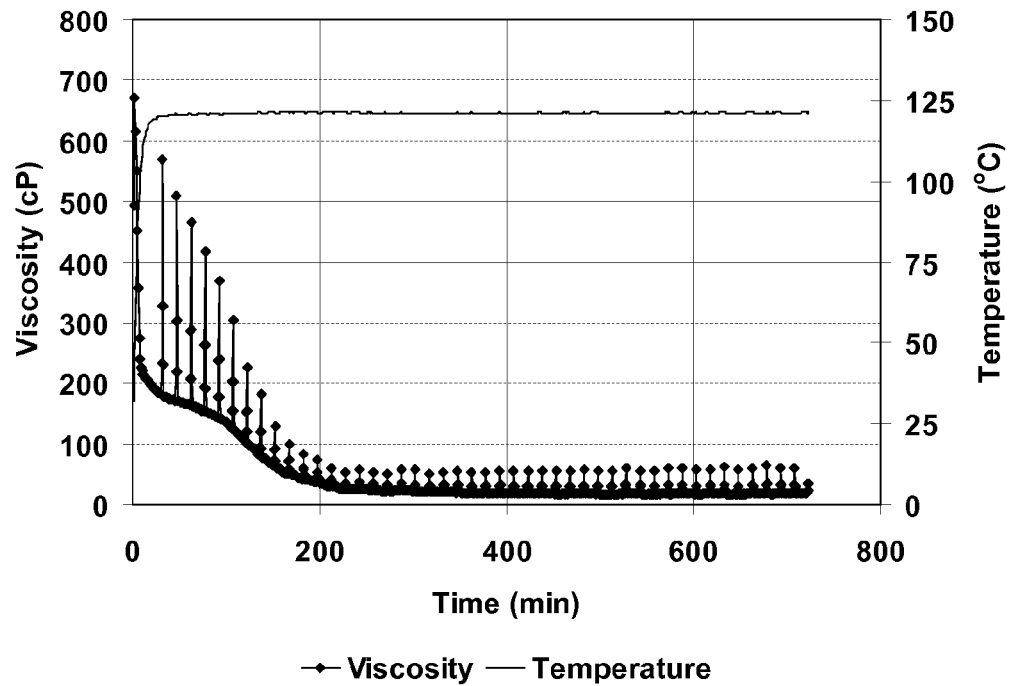
FIG. 6. Viscosity as a function of time for a VES fluid containing 6 volume % BET-E-40 and 2 weight % fructose in 1.39 g/mL (11.6 ppg) $CaCl_2$ at 250° F. (121.1° C.).
Figure 7:
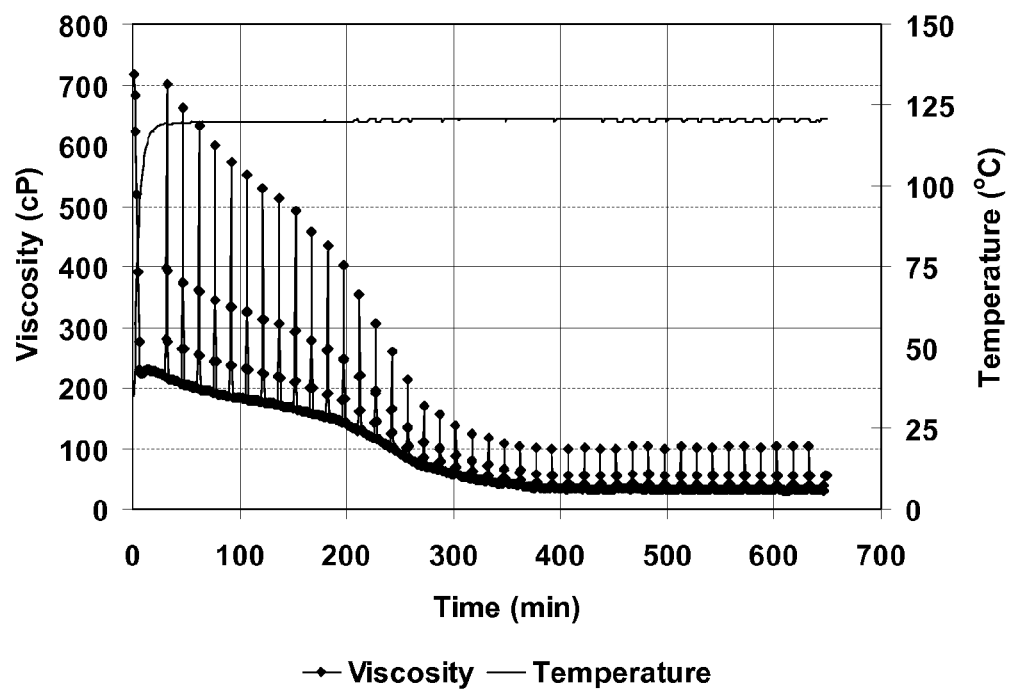
FIG. 7. Viscosity as a function of time for a VES fluid containing 6 volume % BET-E-40 and 2 weight % sucrose in 1.39 g/mL (11.6 ppg) $CaCl_2$ at 250° F. (121.1° C.).
Figure 8:
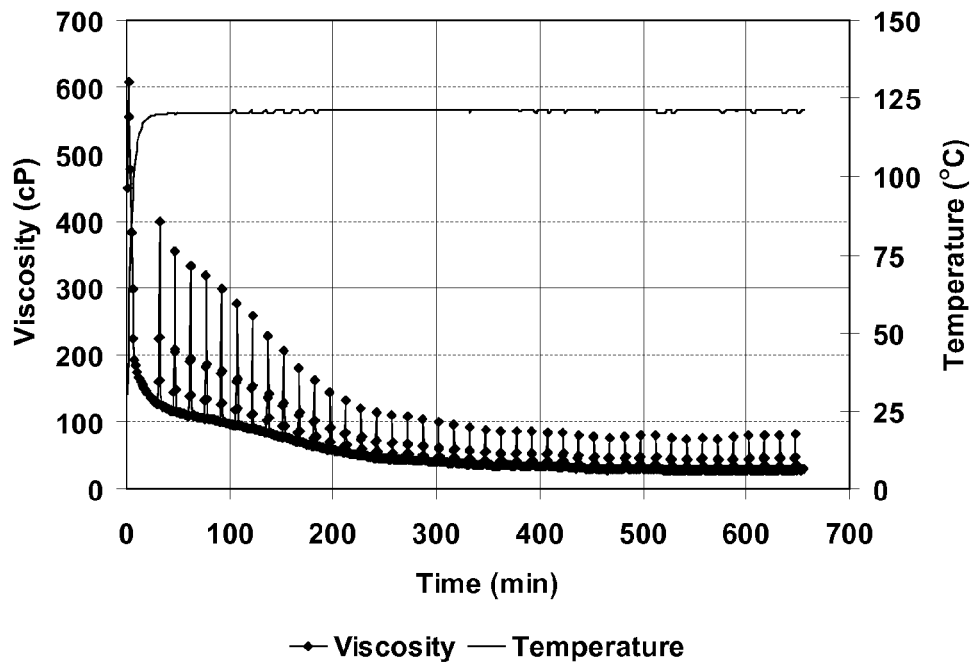
FIG. 8. Viscosity as a function of time for a VES fluid containing 6 volume % BET-E-40 and 2 weight % lactose in 1.39 g/mL (11.6 ppg) $CaCl_2$ at 250° F. (121.1° C.).

FIG. 2, FIG. 4, and FIG. 5 demonstrate that glucose, galactose and mannose all broke down the fluid viscosity at 250° F. (121.1° C.) at comparable rates, suggesting that diastereomerism had little or no effect on the reaction rate. The sugar alcohol sorbitol gave only a minor viscosity reduction after 12 h (see FIG. 3), possibly due to the less active nature of hydroxyl groups compared to aldehyde groups. Fructose, on the other hand, exhibited faster breaking compared with its aldehyde equivalent, glucose (see FIG. 6). This observation was confirmed through bottle tests carried out in a 200° F. (93.3° C.) oven; the fluid turned less viscous more quickly when fructose was used. (In bottle tests, the fluids were allowed to stand unsheared at the test temperature, and periodically observed) FIG. 7 and FIG. 8 show that the disaccharides sucrose and lactose also broke the fluid, just like the mono sugars, and the viscosity reduction rates were not found to be significantly different.

Figure 9:
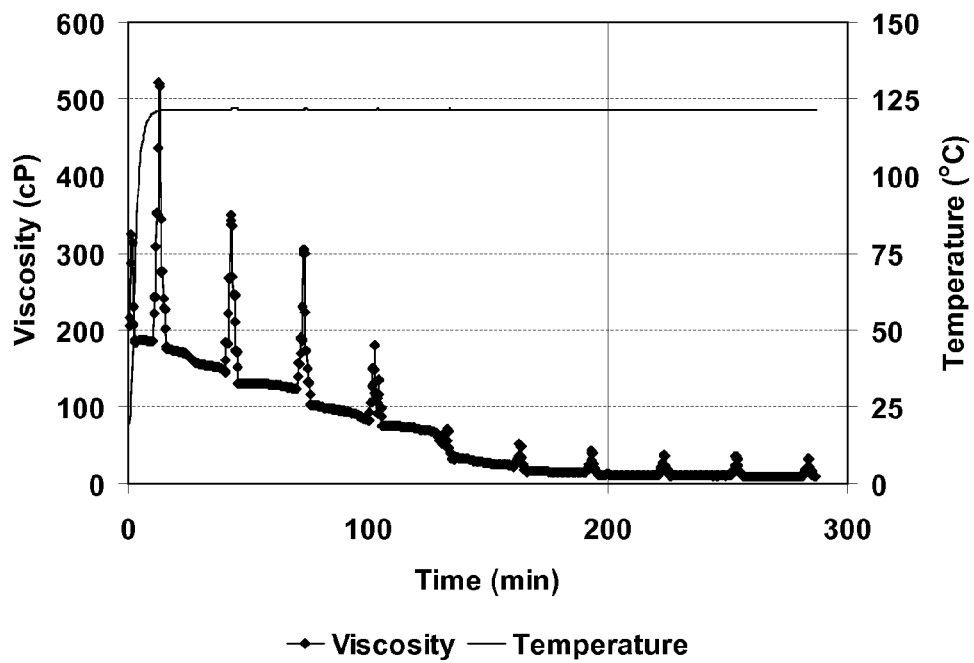
FIG. 9. Viscosity as a function of time for a VES fluid containing 6 volume % BET-E-40 and 0.5 weight % SPLENDA™ in 1.39 g/mL (11.6 ppg) $CaCl_2$ at 250° F. (121.1° C.).
Figure 10:
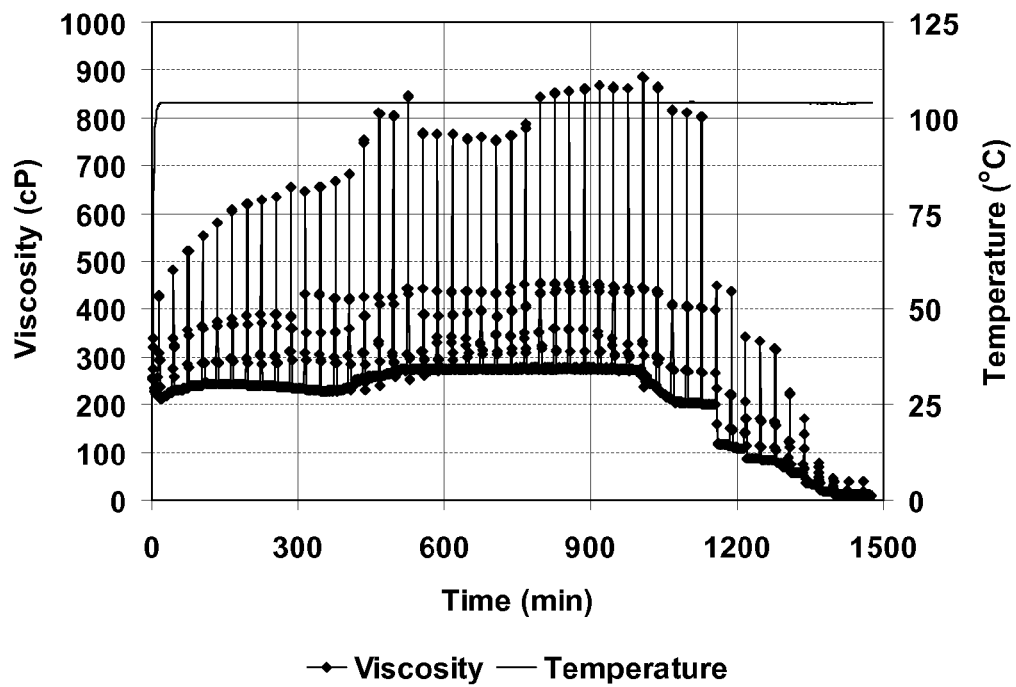
FIG. 10. Viscosity as a function of time for a VES fluid containing 5.5 volume % BET-E-40 and 1 weight % sucralose in 1.39 g/mL (11.6 ppg) $CaCl_2$ at 220° F. (104.4° C.).

The artificial sweetener SPLENDA™, when used directly out of the commercial one-gram packages, also worked as a breaker, as shown in FIG. 9. It should be noted that the active component, sucralose, makes up less than 1 weight % of the total package, which shows that the "filler" materials (the polysaccharides maltodextrin and dextrose) contributed to the observed breaking. A separate test with pure sucralose later confirmed that sucralose alone reduced fluid viscosity, as shown in FIG. 10. Note that in the experiment of FIG. 10, as in some of the other experiments, the added polyol stabilized the viscoelastic fluid for a period of time, in this case for about 15 hours. This effect was most apparent at the highest shear rate used ($100\ sec^{-1}$).

Figure 11:
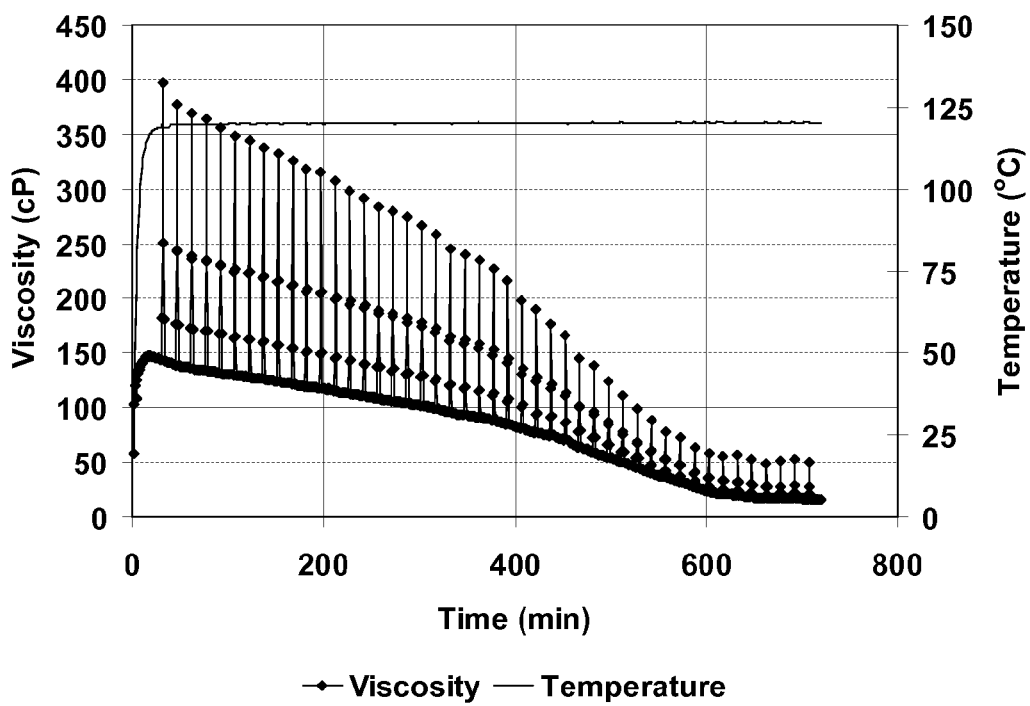
FIG. 11. Viscosity as a function of time for a VES fluid containing 6 volume % BET-E-40 and 2 weight % glucose in 1.39 g/mL (11.6 ppg) $CaBr_2$ at 250° F. (121.1° C.).
Figure 12:
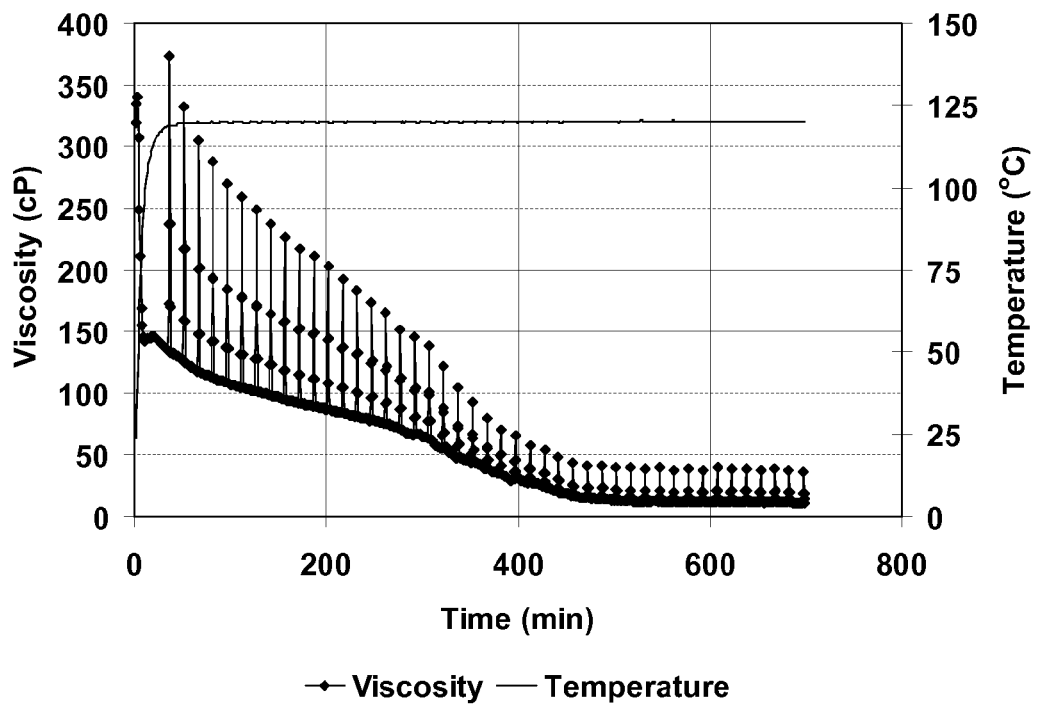
FIG. 12. Viscosity as a function of time for a VES fluid containing 6 volume % BET-E-40 and 2 weight % glucose in 1.39 g/mL (11.6 ppg) NaBr at 250° F. (121.1° C.).

Sugars are also effective breakers in other heavy brines such as calcium bromide and sodium bromide, as shown in FIG. 11 and FIG. 12 for glucose.

Example 2

Sugars Alone as Breakers for VES Fluids in 2% KCl

Figure 13:
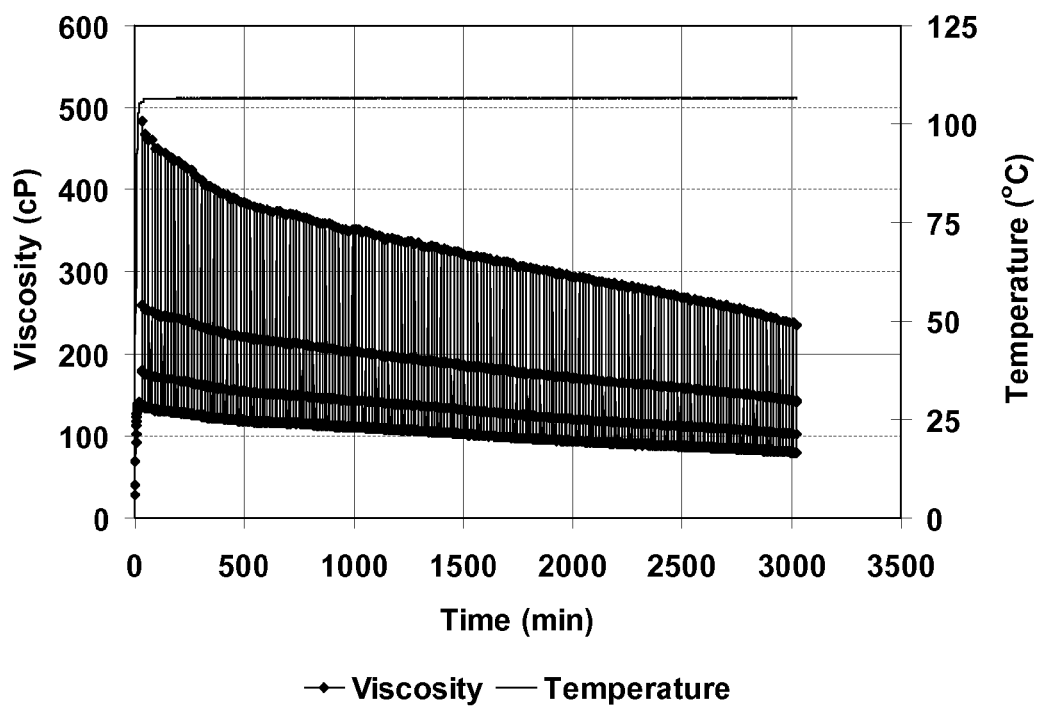
FIG. 13. Viscosity as a function of time for a VES fluid containing 6 volume % BET-E-40, 2 weight % KCl, and 2 weight % glucose at 225° F. (107.2° C.).
Figure 14:
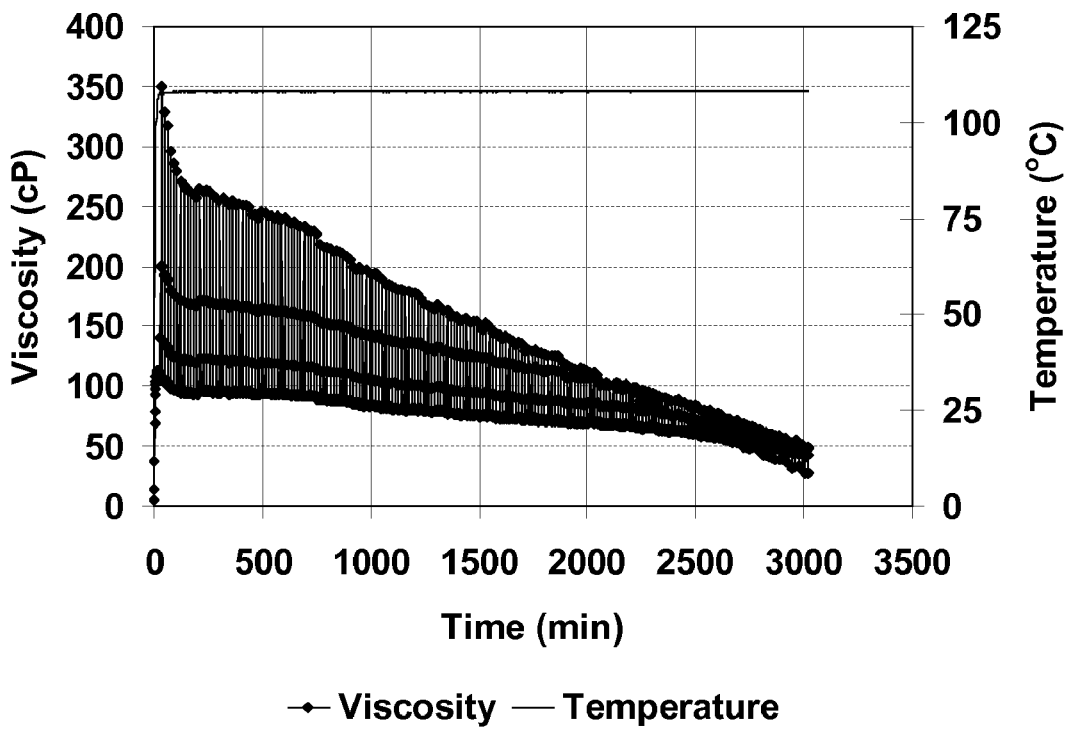
FIG. 14. Viscosity as a function of time for a VES fluid containing 6 volume % BET-E-40, 2 weight % KCl, and 2 weight % fructose at 225° F. (107.2° C.).
Figure 15:
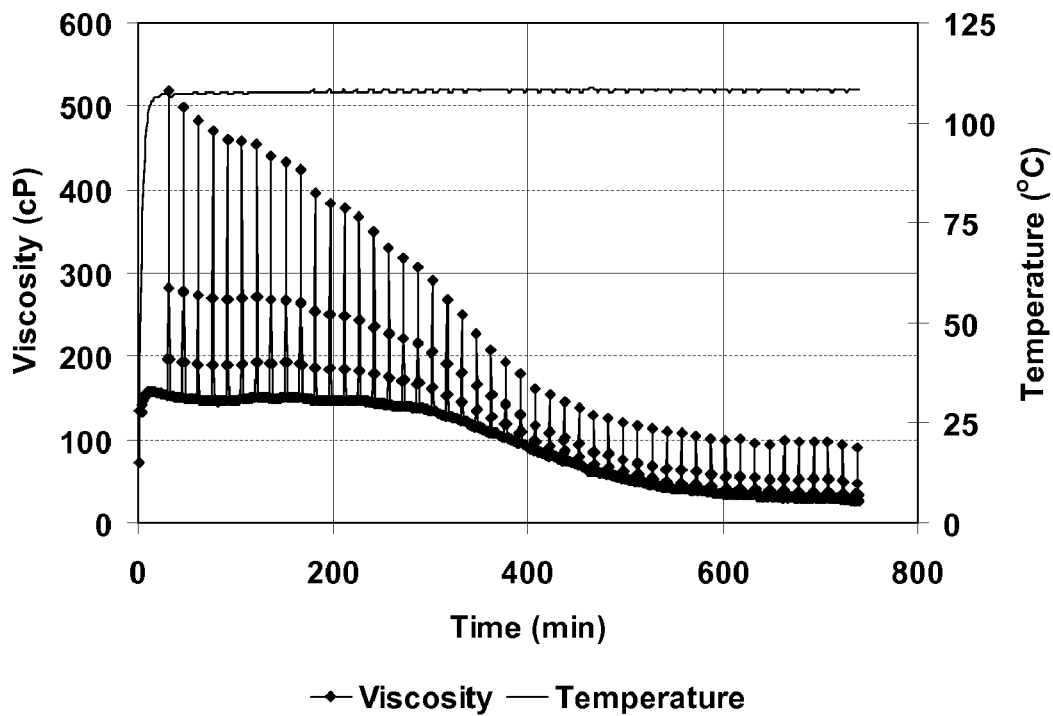
FIG. 15. Viscosity as a function of time for a VES fluid containing 6 volume % BET-E-40, 2 weight % KCl, 1 weight % sodium bromate, and 2 weight % glucose at 225° F. (107.2° C.).
Figure 16:
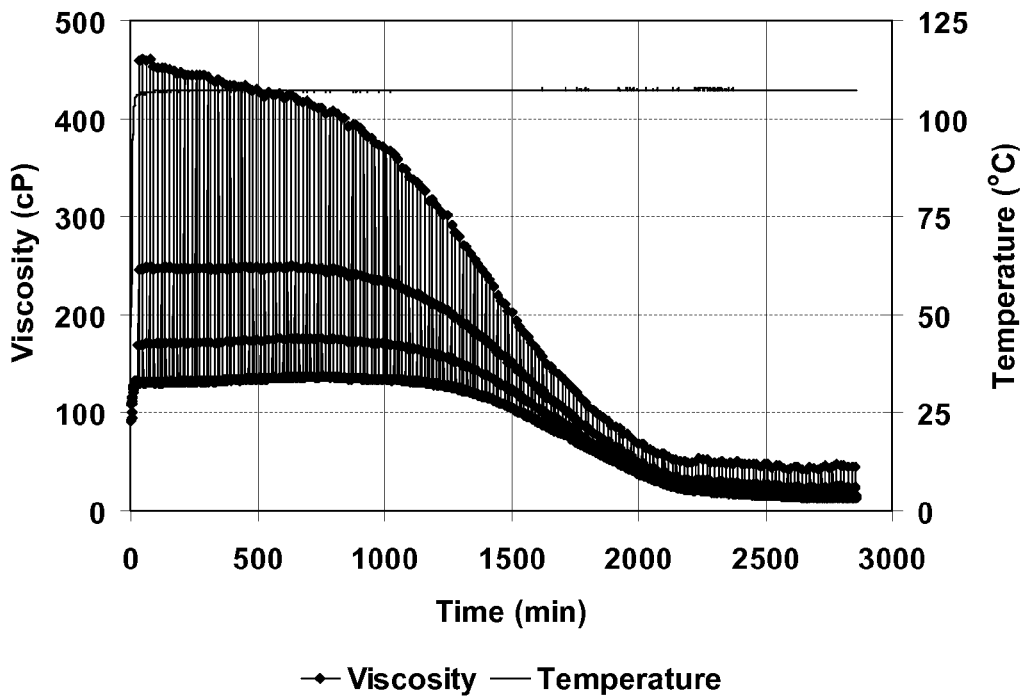
FIG. 16. Viscosity as a function of time for a VES fluid containing 6 volume % BET-E-40, 2 weight % KCl, 1 weight % sodium bromate, and 2 weight % sorbitol at 225° F. (107.2° C.).
Figure 17:
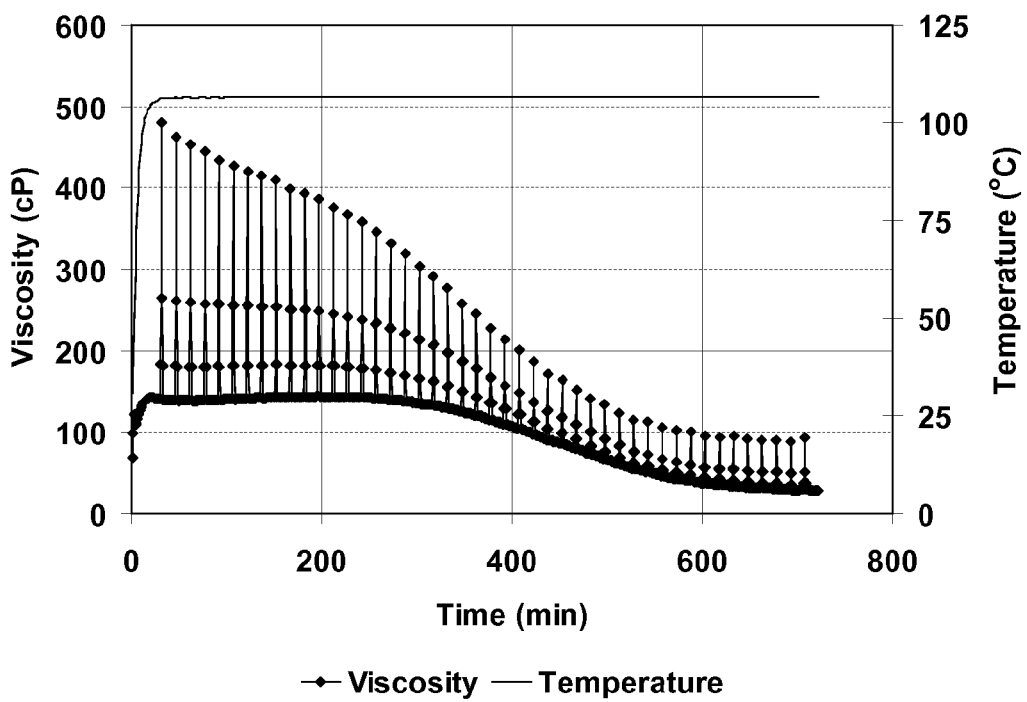
FIG. 17. Viscosity as a function of time for a VES fluid containing 6 volume % BET-E-40, 2 weight % KCl, 1 weight % sodium bromate, and 2 weight % galactose at 225° F. (107.2° C.).
Figure 18:
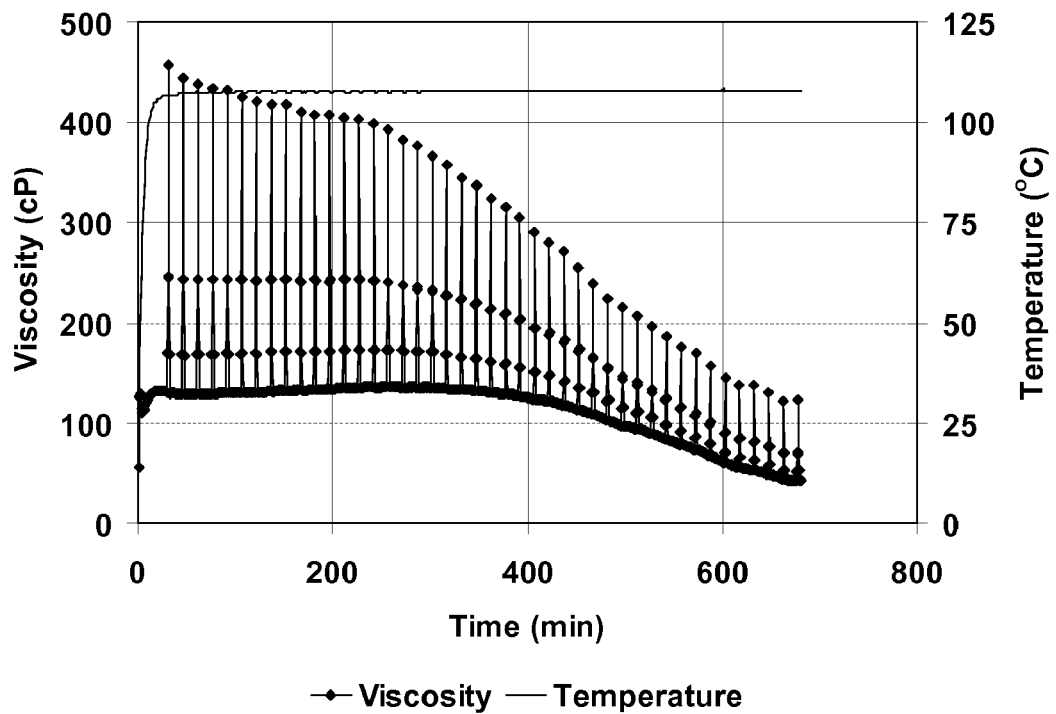
FIG. 18. Viscosity as a function of time for a VES fluid containing 6 volume % BET-E-40, 2 weight % KCl, 1 weight % sodium bromate, and 2 weight % mannose at 225° F. (107.2° C.).
Figure 19:
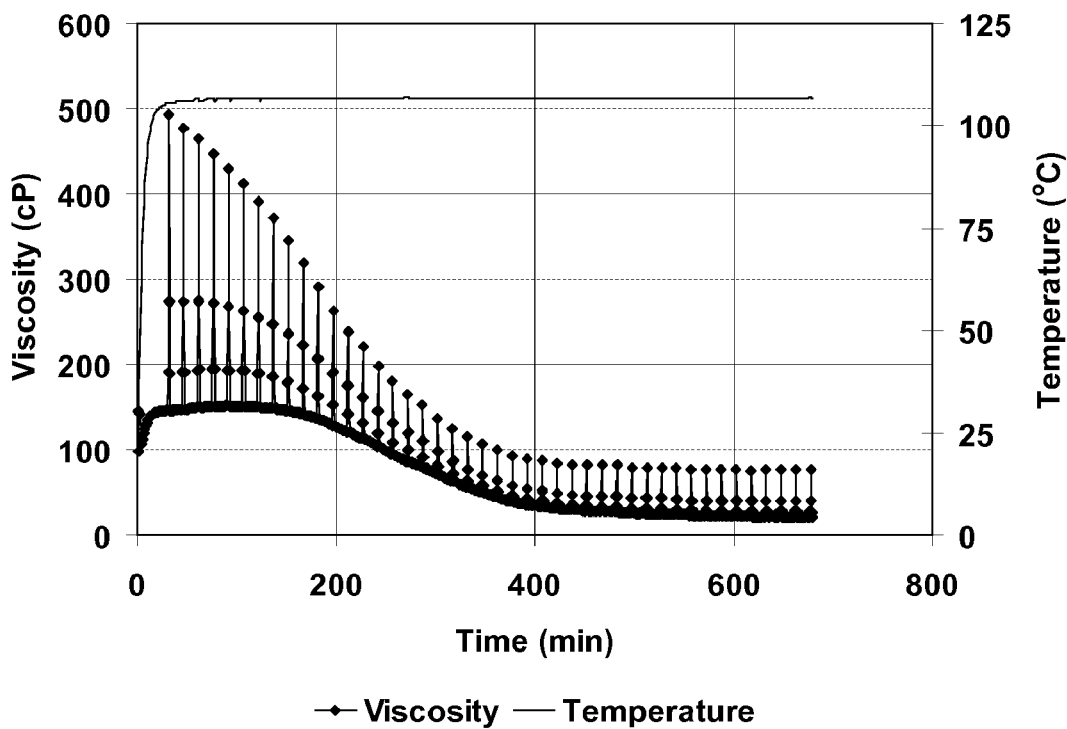
FIG. 19. Viscosity as a function of time for a VES fluid containing 6 volume % BET-E-40, 2 weight % KCl, 1 weight % sodium bromate, and 2 weight % fructose at 225° F. (107.2° C.).
Figure 20:
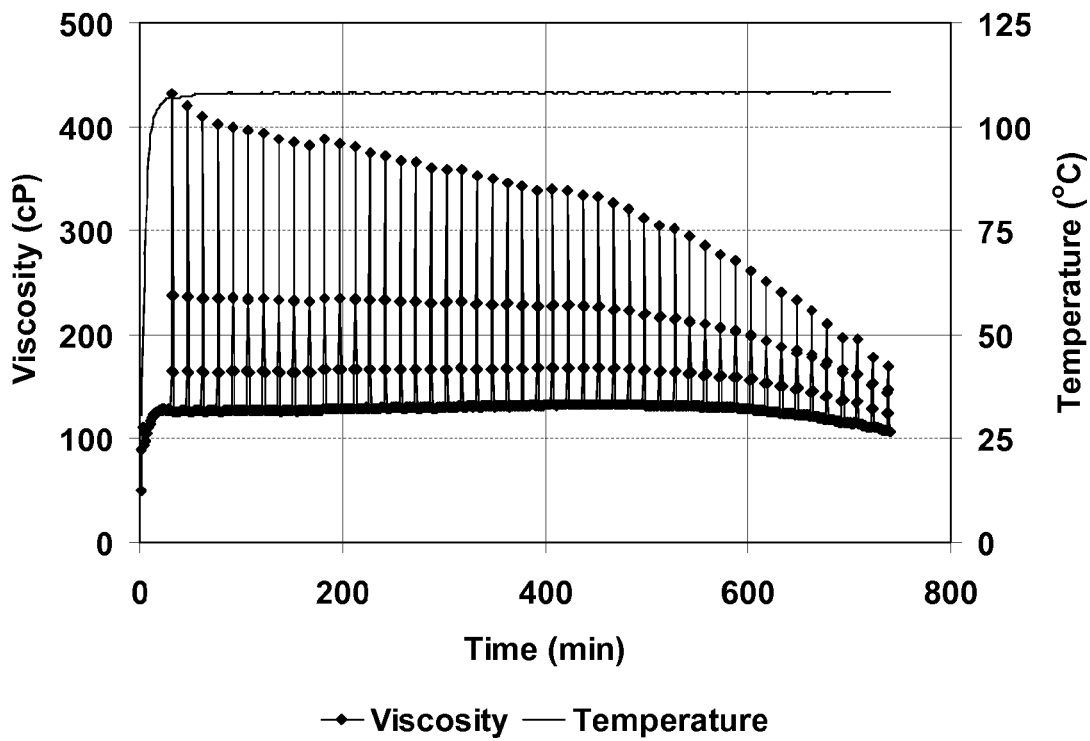
FIG. 20. Viscosity as a function of time for a VES fluid containing 6 volume % BET-E-40, 2 weight % KCl, 1 weight % sodium bromate, and 2 weight % sucrose at 225° F. (107.2° C.).
Figure 21:
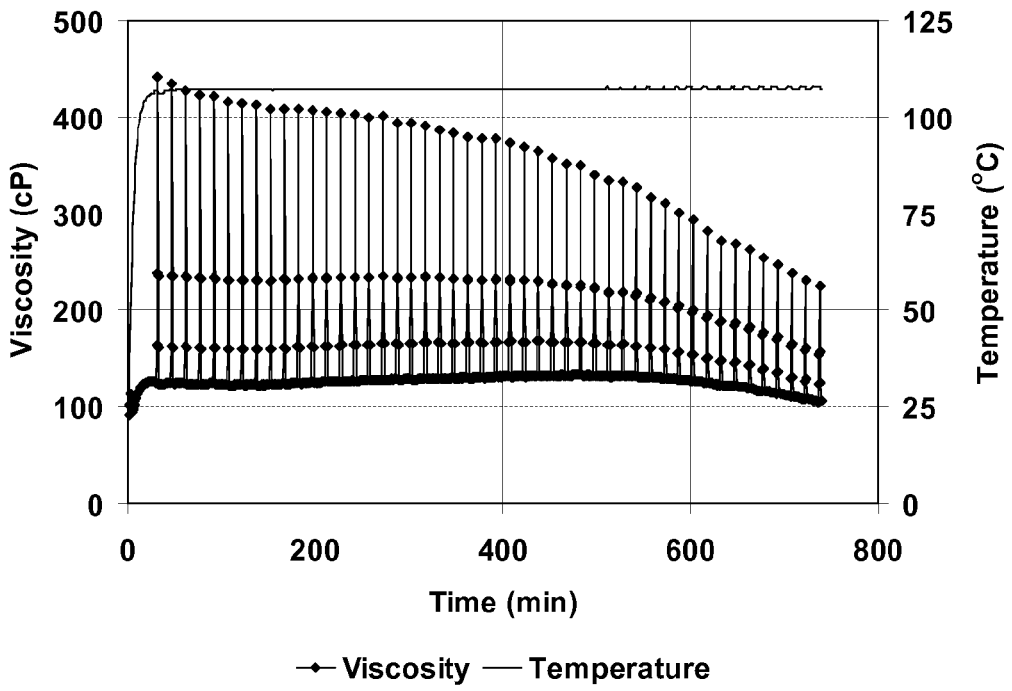
FIG. 21. Viscosity as a function of time for a VES fluid containing 6 volume % BET-E-40, 2 weight % KCl, 1 weight % sodium bromate, and 2 weight % lactose at 225° F. (107.2° C.).

Sugars alone as breakers reduced the fluid viscosity in 2% KCl at 225° F. (107.2° C.). Results are shown in FIG. 13 and FIG. 14 for glucose and fructose respectively. The breaking will be faster with increasing temperature. It can be seen that the ketone sugar fructose was faster, which agrees with what was observed in calcium chloride brine as described earlier in Example 1.

Example 3

Sugars with Oxidizers as Breakers for VES Fluids in 2% KCl

As shown in FIG. 15 through FIG. 21, it was found that sugars other than glucose acted as accelerators for sodium bromate, including the diastereoisomers of glucose and its ketone equivalent. Again, the breaking was slightly faster when fructose was used. The sugar alcohol sorbitol was a noticeably slower activator compared to the other sugars tested at 225° F. (107.2° C.). The test was extended in order to observe the complete break (see FIG. 16). The two disaccharides sucrose and lactose were found to be relatively slower than the mono sugars in activating sodium bromate.

Figure 22:
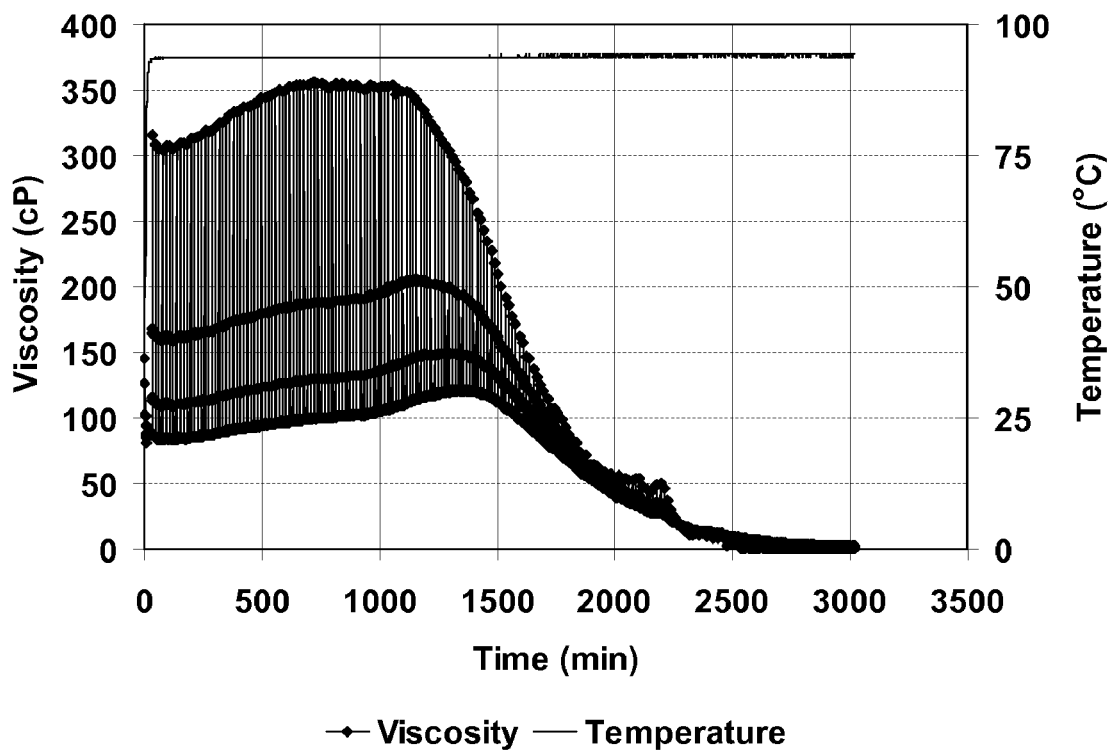
FIG. 22. Viscosity as a function of time for a VES fluid containing 6 volume % BET-E-40, 2 weight % KCl, 1 weight % sodium bromate, and 2 weight % glucose at 200° F. (93.3° C.).
Figure 23:
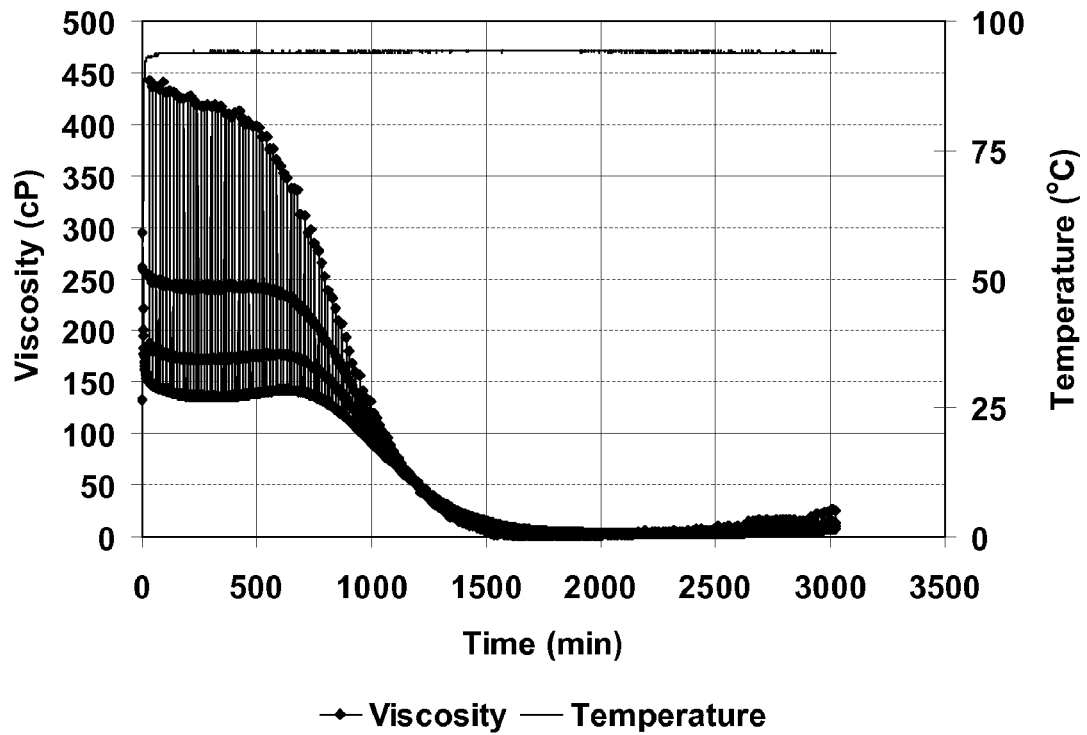
FIG. 23. Viscosity as a function of time for a VES fluid containing 6 volume % BET-E-40, 1 weight % sodium bromate, and 2 weight % sucralose in 2 weight % KCl at 200° F. (93.3° C.).

Parallel bottle tests were also performed in a 200° F. (93.3° C.) oven to verify the viscosity measurements on the Fann 50 qualitatively. When mixed with sodium bromate, all seven sugars tested (d-glucose, d-sorbitol, d-galactose, d-mannose, d-fructose, sucrose, lactose (a minimum of 30% in the β form)) led to breaking of the fluids after two days of aging, giving water-like consistency. As an example, FIG. 22 shows the viscosity reduction over time for glucose at 200° F. (93.3° C.), which agreed well with the oven observations. Note that the glucose appeared to stabilize the fluid, for almost 24 hours, until the break. It should be pointed out that viscosity reductions obtained with sugars alone were slow even at 225° F. (107.2° C.) as noted earlier in Example 2. Thus it was the combination of oxidizer and sugar that contributed the significantly faster breaking. The synthetic sugar sucralose with sodium bromate behaved similarly to naturally occurring sugars, as illustrated in FIG. 23, with a faster rate observed than that for glucose with sodium bromate.

Figure 39:
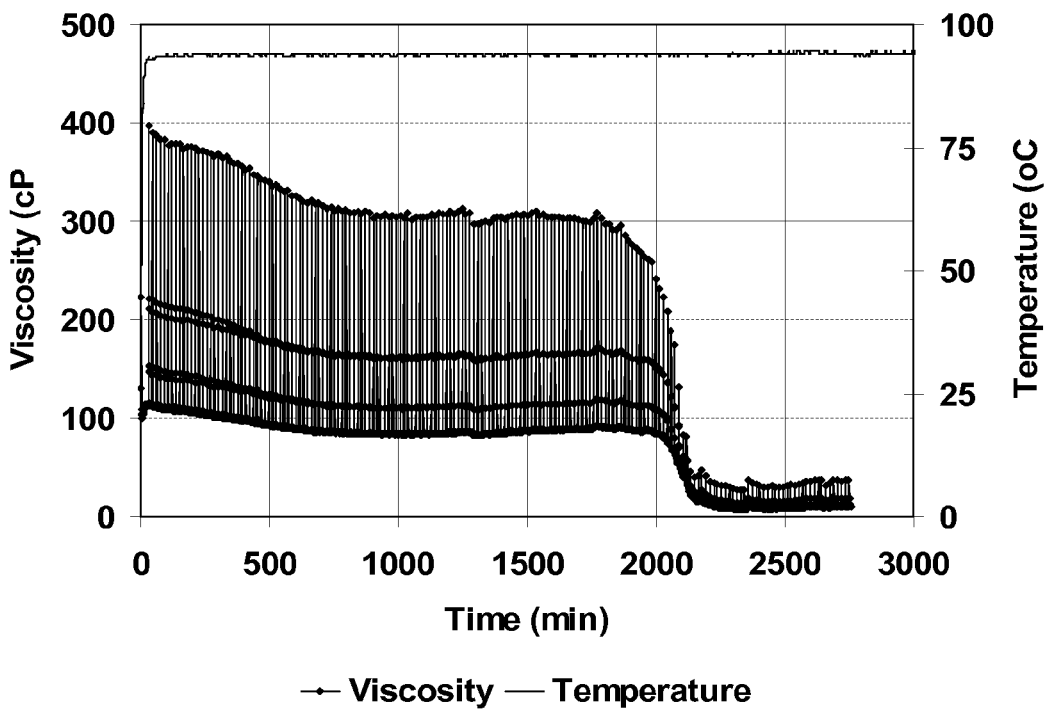
FIG. 39. Viscosity as a function of time for a VES fluid containing 6 volume % BET-E-40, 1 weight % sodium iodate, 2 weight % glucose, and 2 weight % KCl at 200° F. (93.3° C.).
Figure 40:
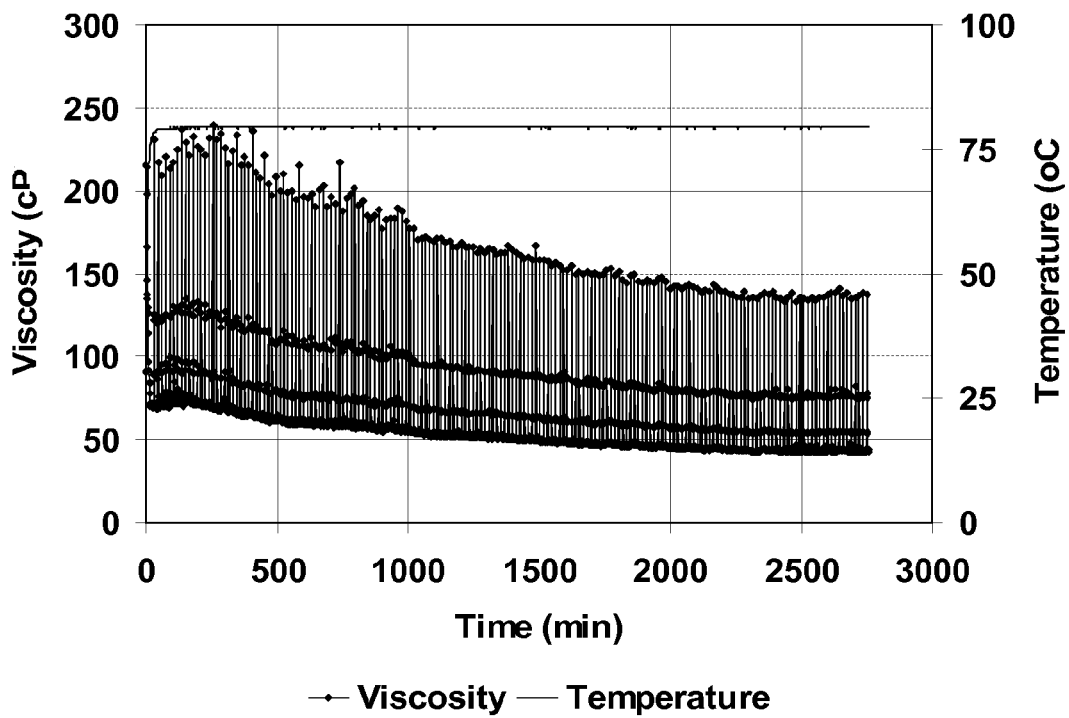
FIG. 40. Viscosity as a function of time for a VES fluid containing 6 volume % BET-E-40, 0.15 weight % sodium persulfate, 2 weight % glucose, and 2 weight % KCl at 175° F. (79.4° C.).

Two other oxidizers were tried. FIG. 39 shows results with glucose and sodium iodate at 200° F. (93.3° C.); comparison to FIG. 22 shows that iodate was similar to bromate. FIG. 40 shows the results with glucose and sodium persulfate at 175° F. (79.4° C.); the combination was active at this low temperature.

Example 4

Sugars with Sodium Bromate as Breakers for VES Fluids in Heavy Brines

Figure 24:
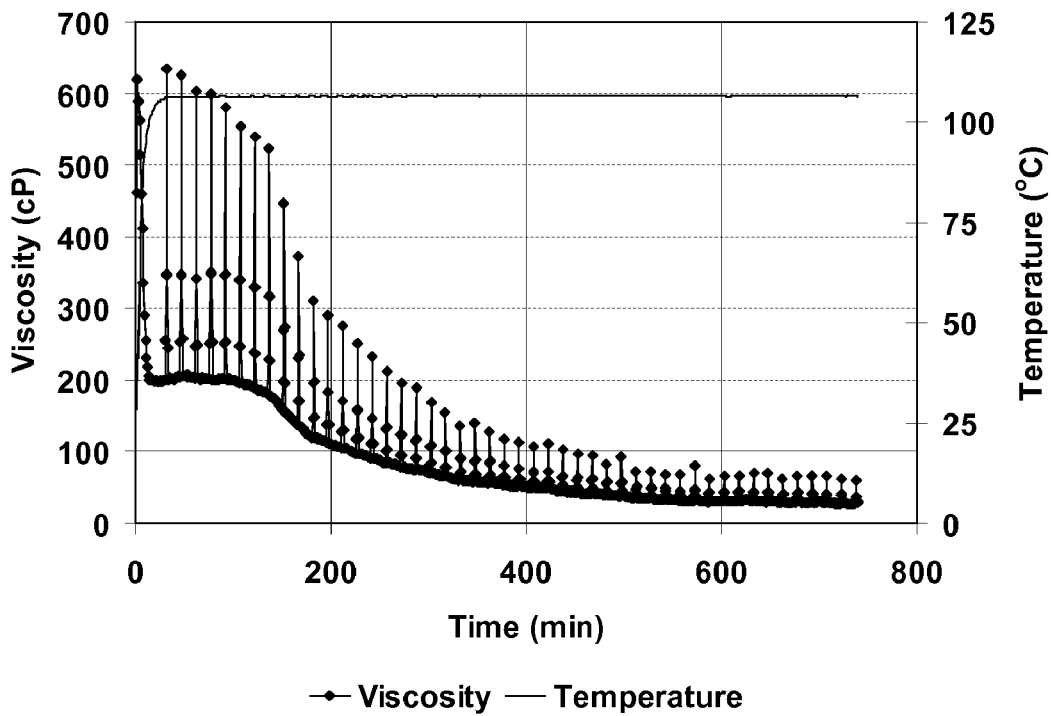
FIG. 24. Viscosity as a function of time for a VES fluid containing 6 volume % BET-E-40, 1 weight % sodium bromate, and 2 weight % glucose in 1.39 g/mL (11.6 lbm/gal) $CaCl_2$ at 225° F. (107.2° C.).
Figure 25:
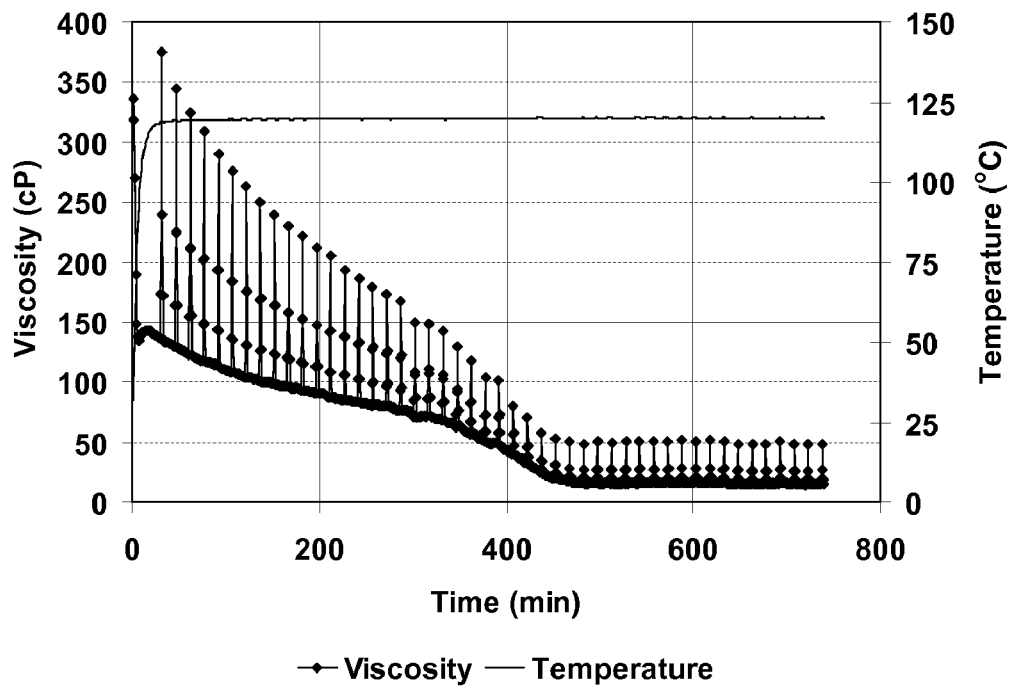
FIG. 25. Viscosity as a function of time for a VES fluid containing 6 volume % BET-E-40, 1 weight % sodium bromate, and 2 weight % glucose in 1.39 g/mL (11.6 lbm/gal) NaBr at 250° F. (121.1° C.).
Figure 26:
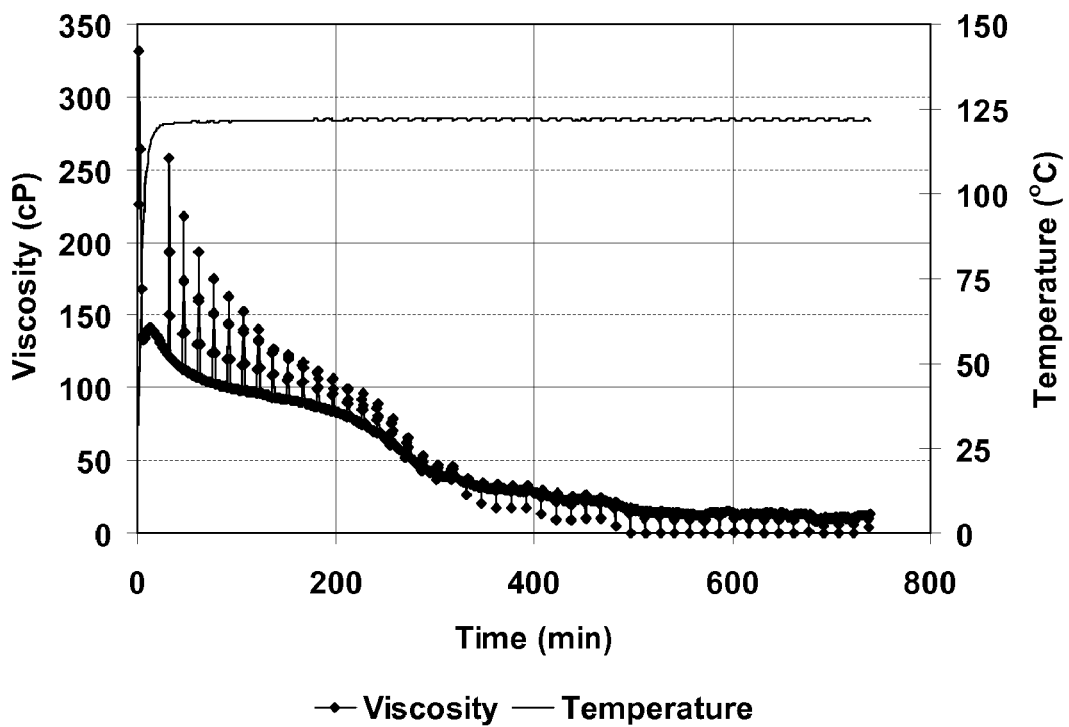
FIG. 26. Viscosity as a function of time for a VES fluid containing 6 volume % BET-E-40, 1 weight % sodium bromate, and 2 weight % fructose in 1.39 g/mL (11.6 lbm/gal) NaBr at 250° F. (121.1° C.).

FIG. 24 to FIG. 26 show that the combination of sugar and sodium bromate also performed well in heavy brines. Faster viscosity reduction is believed to occur in calcium chloride brine than in sodium bromide brine, considering the comparable reduction rates at 225° F. (107.2° C.) in calcium chloride (FIG. 24) and at 250° F. (121.1° C.) in sodium bromide (FIG. 25). Further bottle tests in an oven at 200° F. (93.3° C.) confirmed that the fluid degraded more quickly in calcium chloride than in sodium bromide.

In addition, by comparing the results displayed in FIG. 25 and FIG. 26, it can be seen that fructose again resulted in faster breaking than glucose, which is consistent with the observations detailed in the previous examples.

Example 5

Polyols with Sodium Bromate as Breakers for VES Fluids in 2% KCl

Figure 27:
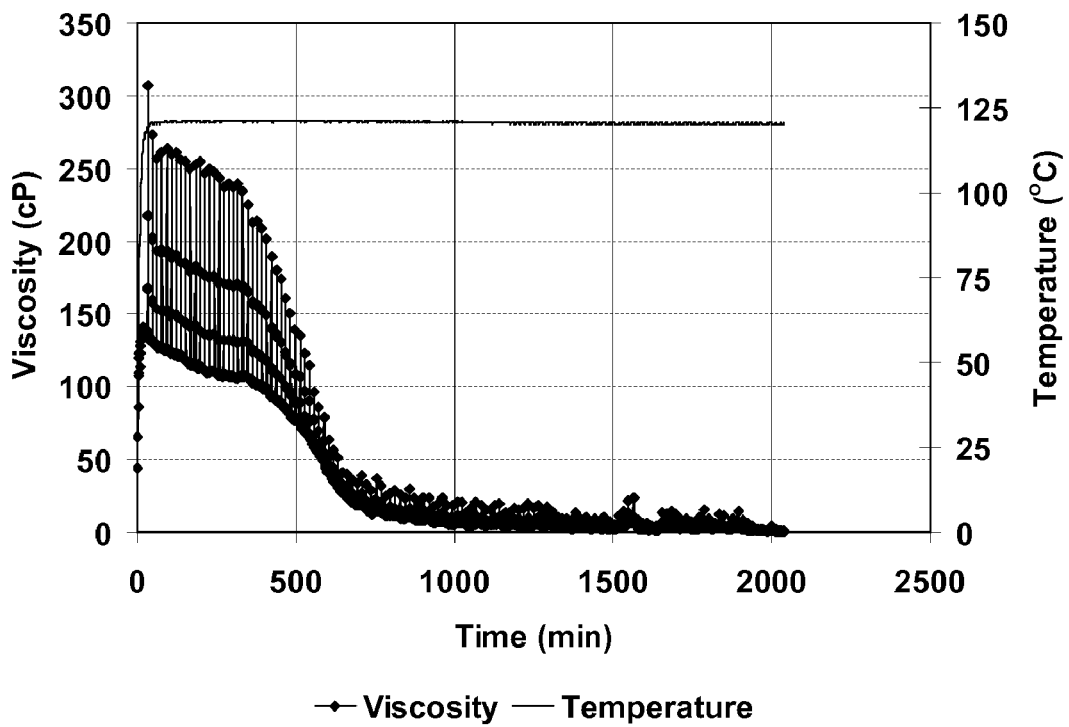
FIG. 27. Viscosity as a function of time for a VES fluid containing 6 volume % BET-E-40, 1 weight % sodium bromate, and 1 volume % glycerol in 2 weight % KCl at 250° F. (121.1° C.).
Figure 28:
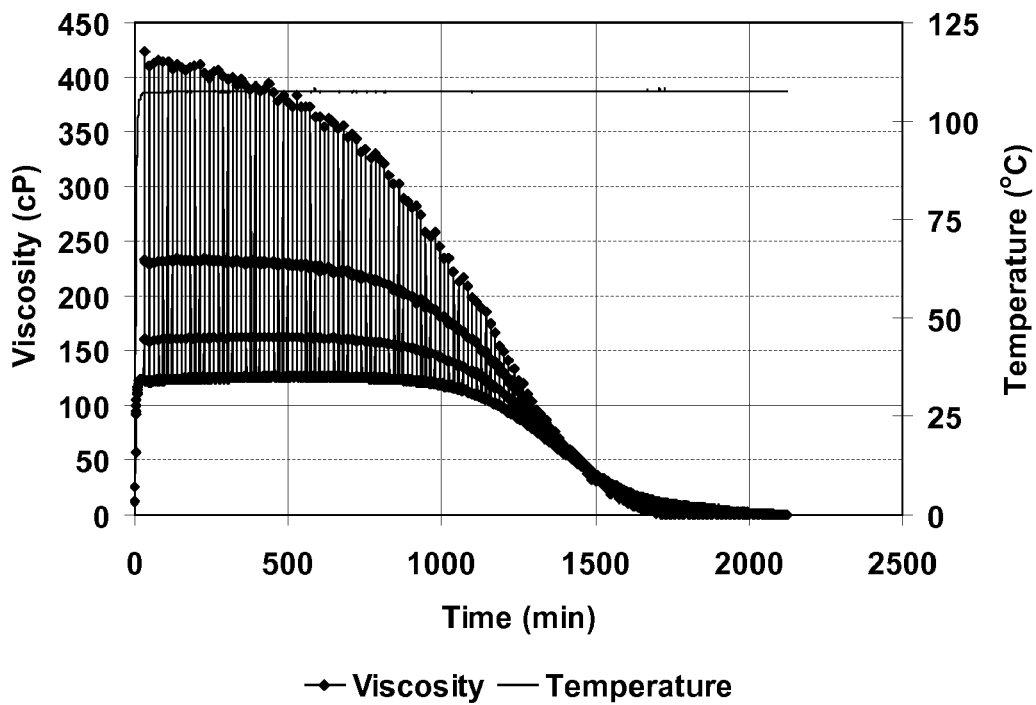
FIG. 28. Viscosity as a function of time for a VES fluid containing 6 volume % BET-E-40, 1 weight % sodium bromate, and 1 volume % ethylene glycol in 2 weight % KCl at 225° F. (107.2° C.).
Figure 29:
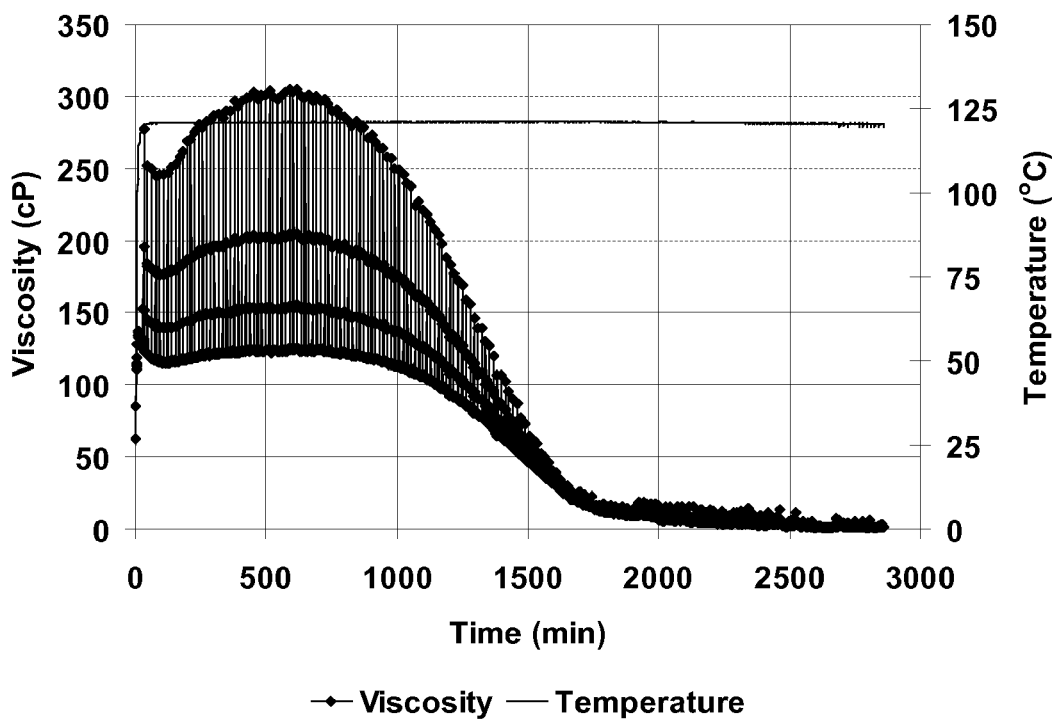
FIG. 29. Viscosity as a function of time for a VES fluid containing 6 volume % BET-E-40, 1 weight % sodium bromate, and 1 volume % propylene glycol (1,2-propanediol) in 2 weight % KCl at 250° F. (121.1° C.).
Figure 30:
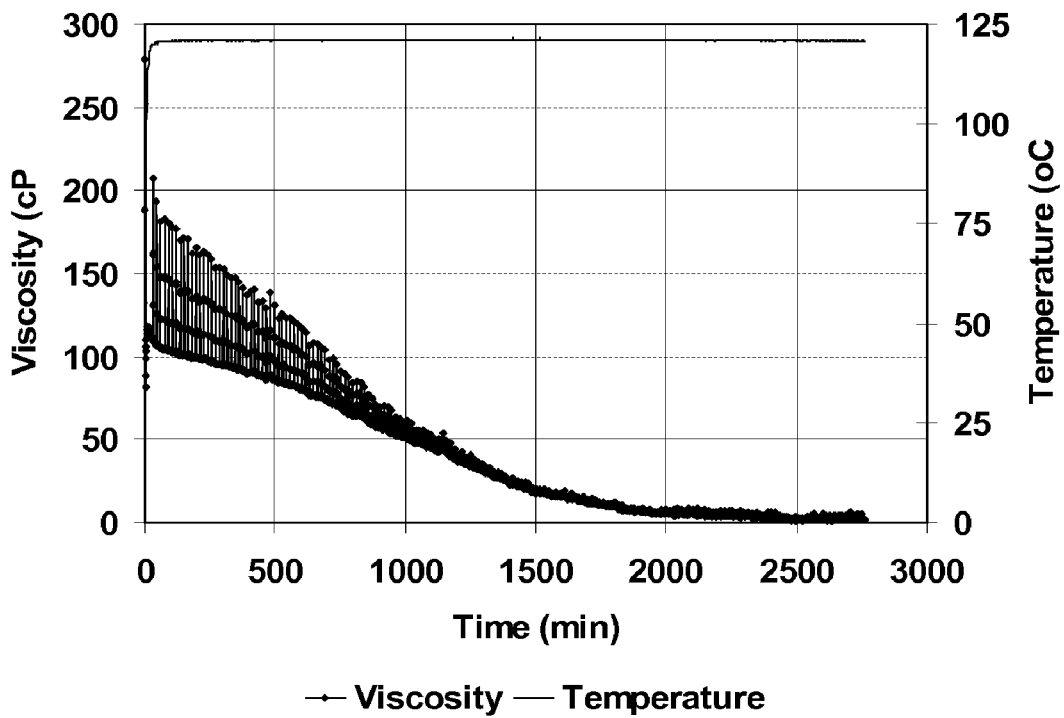
FIG. 30. Viscosity as a function of time for a VES fluid containing 6 volume % BET-E-40, 1 weight % sodium bromate, and 1 volume % 1,3-propanediol in 2 weight % KCl at 250° F. (121.1° C.).
Figure 31:
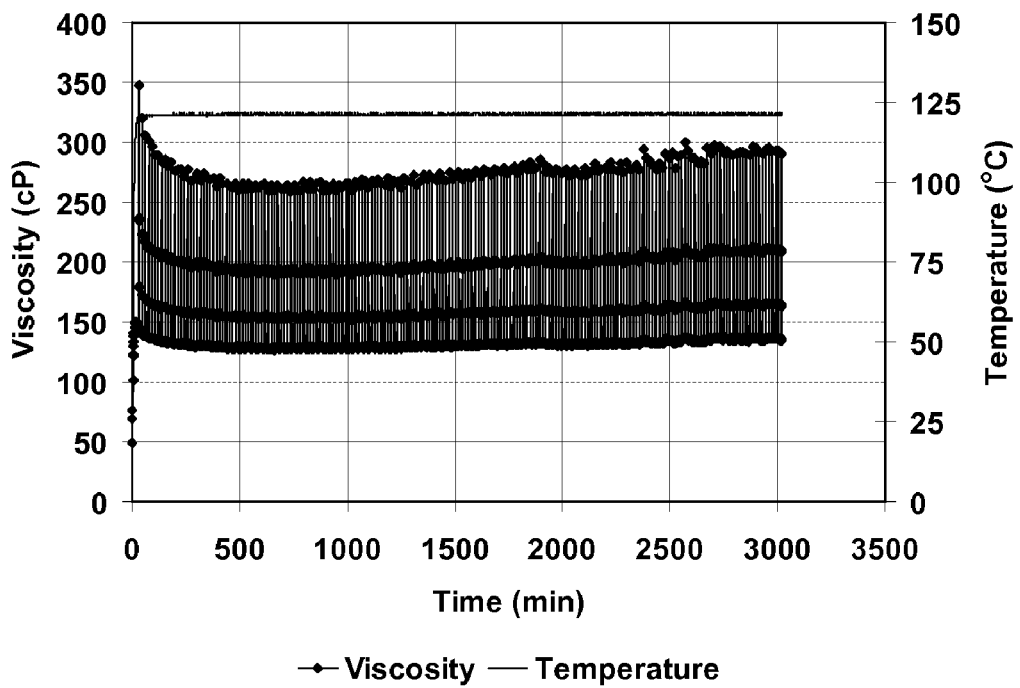
FIG. 31. Viscosity as a function of time for a VES fluid containing 6 volume % BET-E-40 and 1 volume % glycerol in 2 weight % KCl at 250° F. (121.1° C.).
Figure 32:
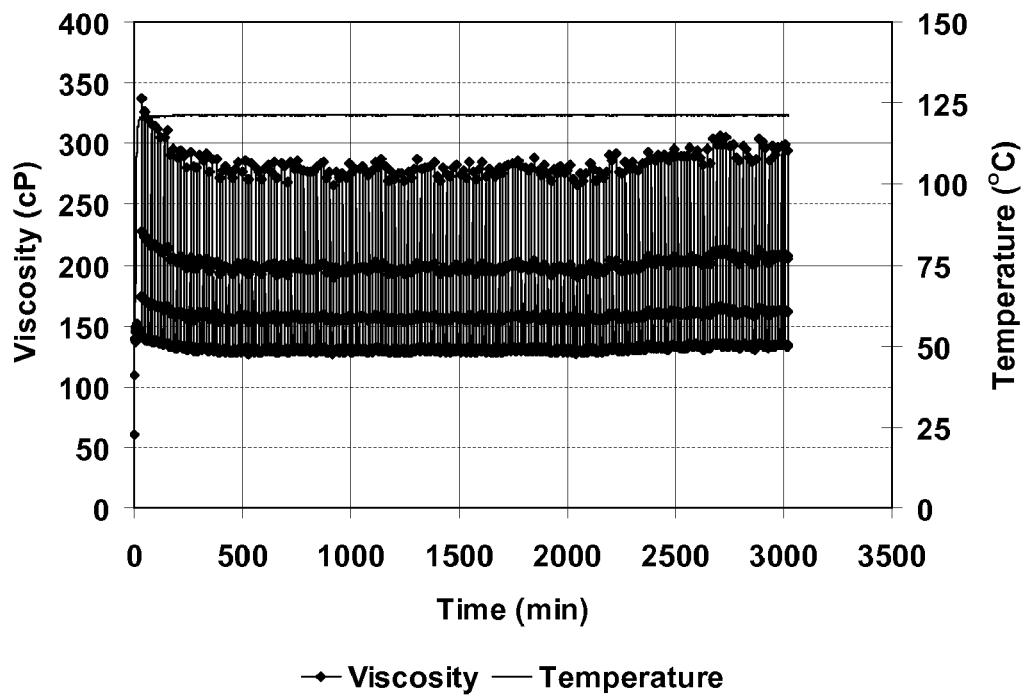
FIG. 32. Viscosity as a function of time for a VES fluid containing 6 volume % BET-E-40 and 1 volume % ethylene glycol in 2 weight % KCl at 250° F. (121.1° C.).
Figure 33:
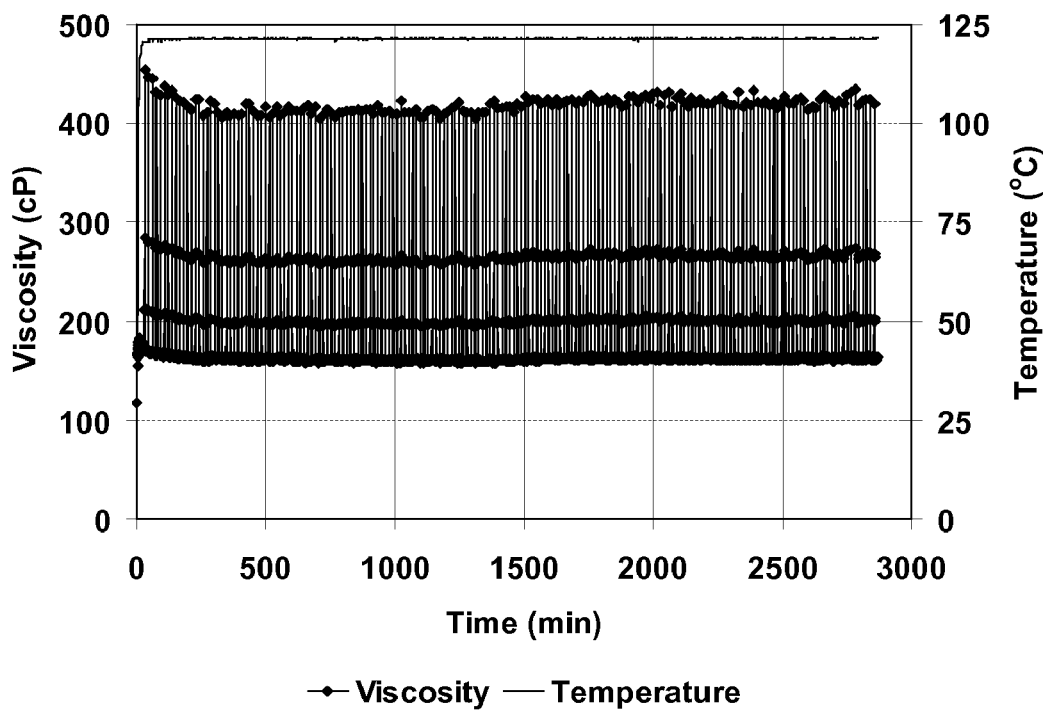
FIG. 33. Viscosity as a function of time for a VES fluid containing 6 volume % BET-E-40 and 1 volume % propylene glycol (1,2-propanediol) in 2 weight % KCl at 250° F. (121.1° C.).
Figure 34:
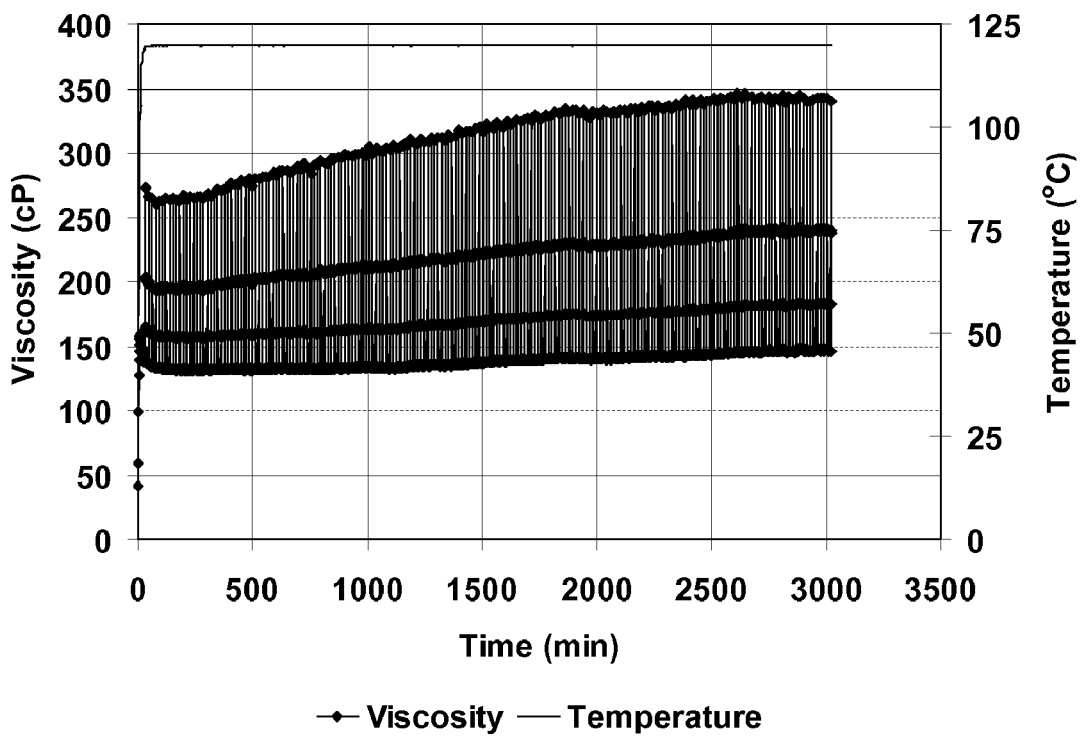
FIG. 34. Viscosity as a function of time for a VES fluid containing 6 volume % BET-E-40 and 1 volume % 1,3-propanediol in 2 weight % KCl at 250° F. (121.1° C.).

Although the sugar alcohol sorbitol was a slower breaker aide for sodium bromate than the other sugars examined, it did accelerate the break over sodium bromate alone. The breaker study was therefore extended to assess other polyols, such as glycerol and ethylene glycol, both of which surprisingly broke down VES fluids at 250° F. (121.1° C.) when used with sodium bromate. The viscosity measurements are plotted in FIG. 27 and FIG. 28, showing that glycerol was the more active. It should be noted that both glycerol and ethylene glycol contain hydroxyl groups that are attached to two adjacent carbons. To investigate whether placement of the hydroxyls in the molecule is critical, propylene glycol (1,2-propanediol) and 1,3-propanediol were then examined. Both diols effectively accelerated the break at 250° F. (121.1° C.) (see FIG. 29 and FIG. 30), and, interestingly, the 1,3-diol led to faster viscosity reduction. In fact, 1,2-propanediol stabilized the fluid for the first 10 to 15 hours.

With these small diols, it could have been possible that the observed breaks were attributable to the solvent effect that generally destabilizes VES fluids at elevated temperatures. Control experiments with polyols alone were therefore conducted. The results, shown in FIG. 31 to FIG. 34, clearly indicate that the solvent effect was negligible. Therefore it was the combination of polyols and sodium bromate that actually caused the breaking.

Example 6

Figure 35:
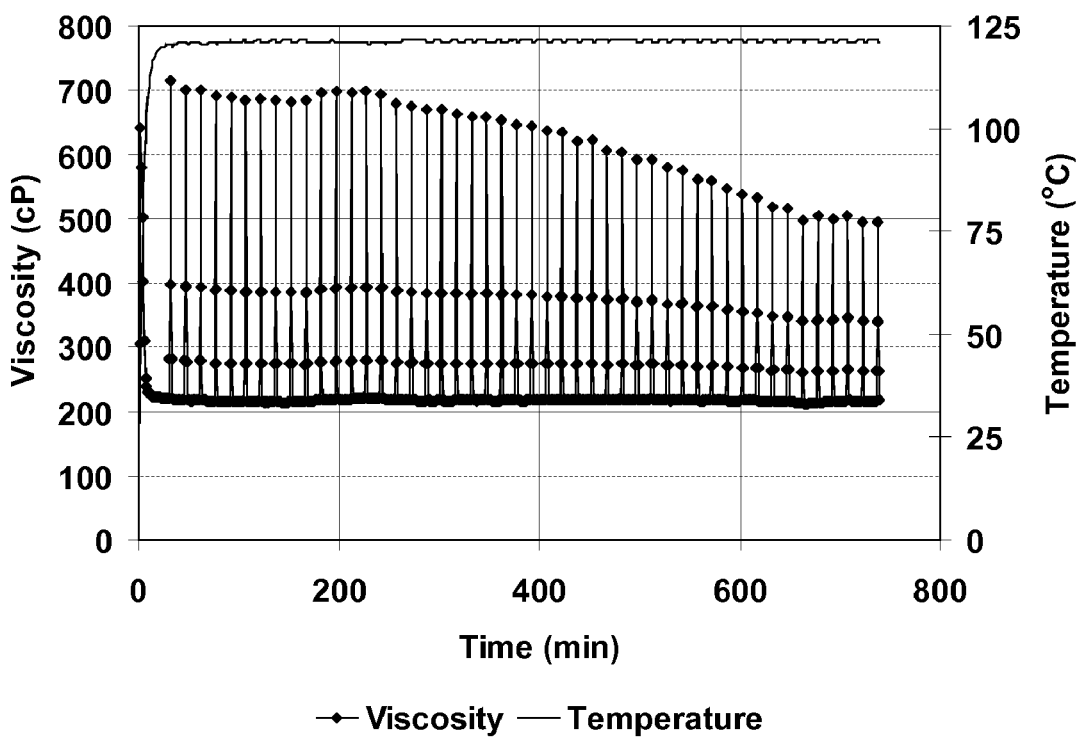
FIG. 35. Viscosity as a function of time for a VES fluid containing 6 volume % BET-E-40, 1 weight % sodium bromate, and 1 volume % glycerol in 1.39 g/mL (11.6 ppg) $CaCl_2$ at 250° F. (121.1° C.).
Figure 36:
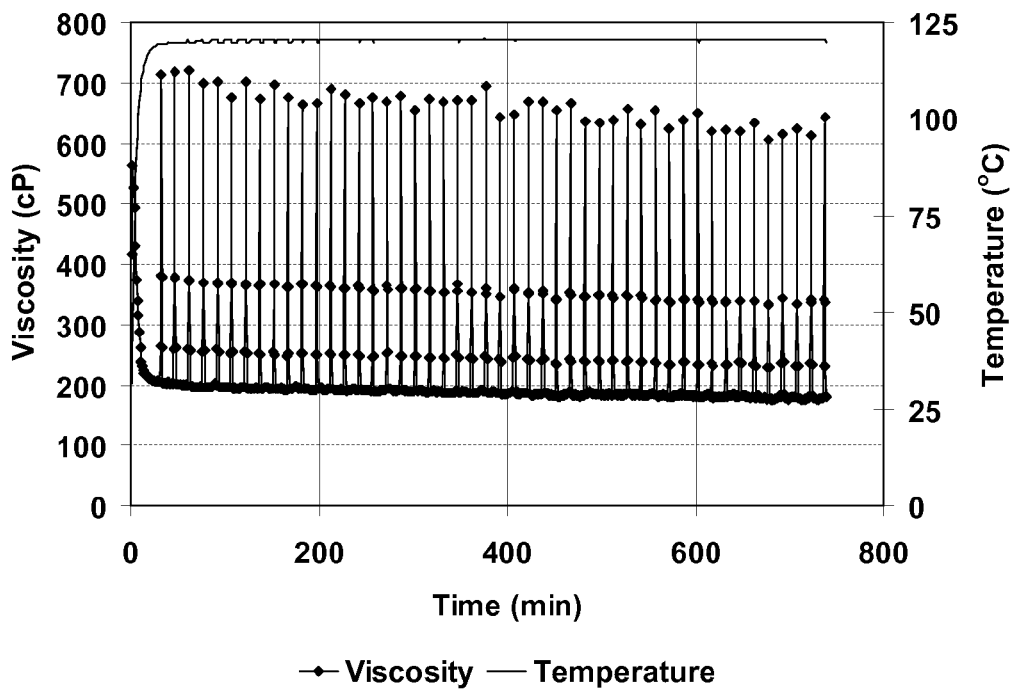
FIG. 36. Viscosity as a function of time for a VES fluid containing 6 volume % BET-E-40 and 1 volume % glycerol in 1.39 g/mL (11.6 ppg) $CaCl_2$ at 250° F. (121.1° C.).

Non-Sugar Polyols with Sodium Bromate as Breakers for VES Fluids in Heavy Brines Experiments were done for 12 hours only. The difference in viscosity profiles between FIG. 35 and FIG. 36 shows that using sodium bromate together with glycerol gives faster viscosity reduction than with that polyol alone, and that a complete breakdown may be achieved if a longer test time were used.

Example 7

Monoalcohols with Sodium Bromate as Breakers for VES Fluids in 2% KCl

Figure 41:
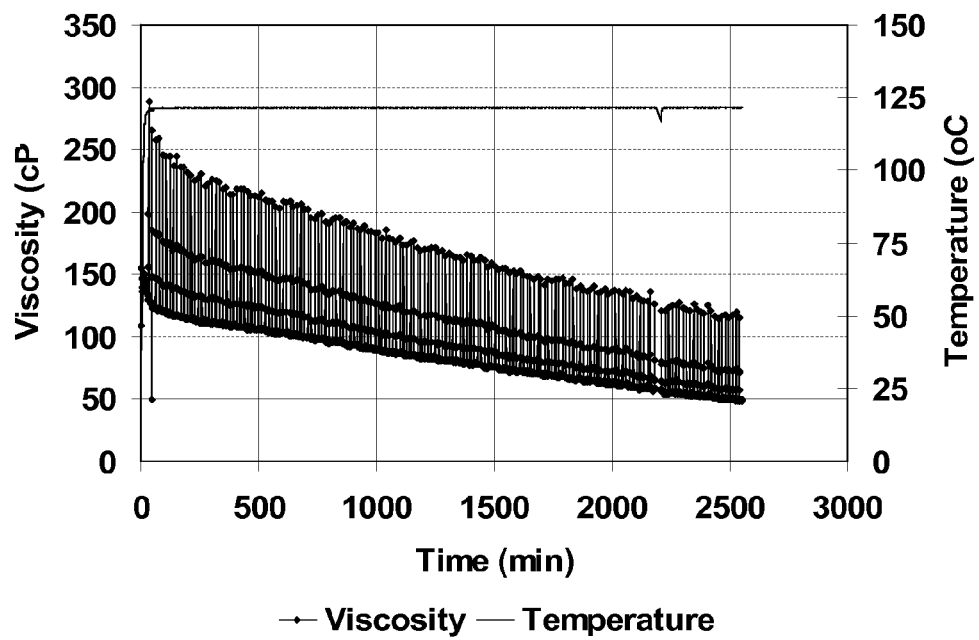
FIG. 41. Viscosity as a function of time for a VES fluid containing 6 volume % BET-E-40, 1 weight % sodium bromate, 1 volume % ethanol, and 2 weight % KCl at 250° F. (121.1° C.).
Figure 42:
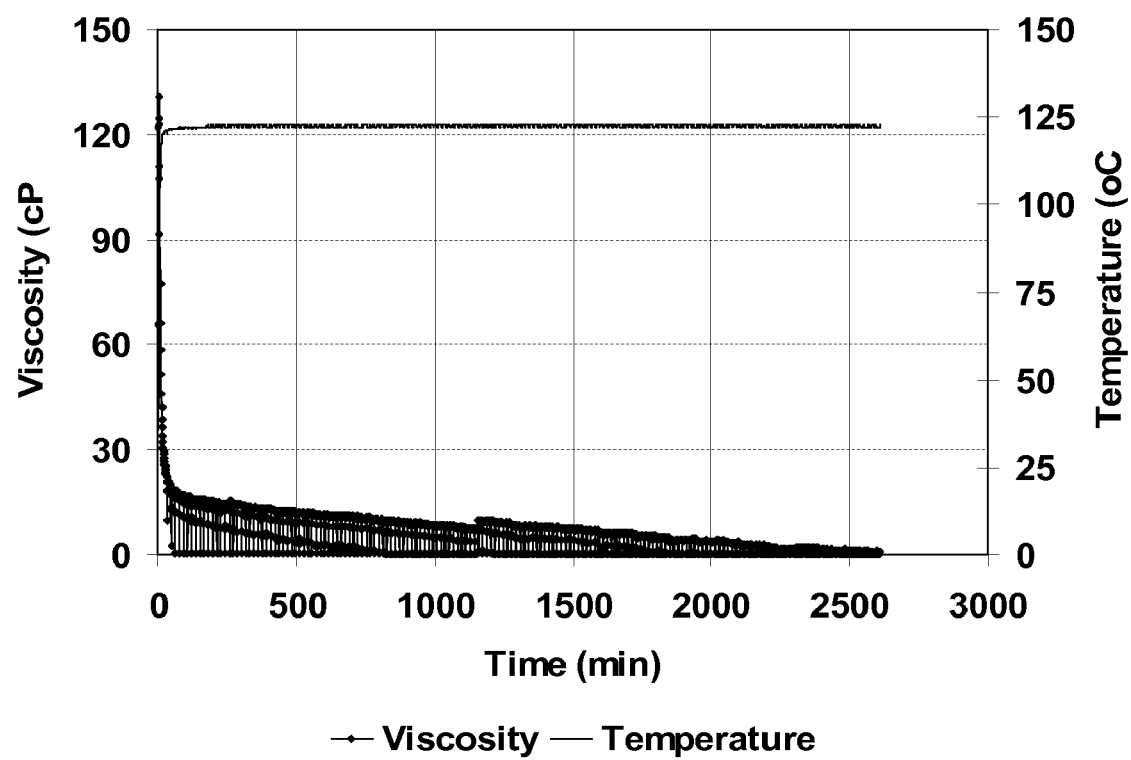
FIG. 42. Viscosity as a function of time for a VES fluid containing 6 volume % BET-E-40, 1 weight % sodium bromate, 1 volume % 1-butanol, and 2 weight % KCl at 250° F. (121.1° C.).

Experiments were performed using sodium bromate as the oxidizer at 250° F. (121.1° C.) with 1 volume % ethanol (FIG. 41) or 1 volume % 1-butanol (FIG. 42).

Comparison to FIG. 38 shows that both simple monoalcohols were active breaker aides.

Having thus described our invention, we claim:

1. A composition comprising an aqueous fluid, a betaine surfactant as a viscosifier, and an internal breaker consisting of a polyol and an oxidizing agent soluble in the fluid, wherein the polyol is 1, 3 propanediol, a sugar alcohol or sugar ketone, wherein the oxidizing agent comprises a bromate, iodate or persulfate.

2. The composition of claim 1 wherein the surfactant comprises oleylamidopropyl betaine or erucylamidopropyl betaine.

3. The composition of claim 1 wherein the polyol is selected from sorbitol, fructose, sucrose, lactose, dextrose, maltodextrin, sucralose, and mixtures thereof.

4. The composition of claim 1 wherein the fluid comprises a heavy brine.

5. The composition of claim 1 further comprising a monoalcohol.

6. The composition of claim 5 wherein the monoalcohol comprises from 1 to 24 carbon atoms, may be linear, branched, or cyclic, and may be saturated or unsaturated, and may be a mixture of such monoalcohols.

7. A method of treating a subterranean formation penetrated by a wellbore comprising a) injecting into the pores of the formation an aqueous fluid comprising a betaine surfactant as viscosifier and an internal breaker consisting of a polyol and an oxidizing agent soluble in the fluid, wherein the polyol is 1, 3 propanediol, a sugar alcohol or sugar ketone, wherein the oxidizing agent comprises a bromate, iodate or persulfate, and b) allowing said fluid to lose viscosity in the pores after the injection.

8. The method of claim 7 wherein the surfactant comprises oleylamidopropyl betaine or erucylamidopropyl betaine.

9. The method of claim 7 wherein the polyol is selected from sorbitol, fructose, sucrose, lactose, dextrose, maltodextrin, sucralose, and mixtures thereof.

10. The method of claim 7 wherein the fluid comprises a heavy brine.

11. The method of claim 7 wherein the fluid further comprises a monoalcohol.

12. The method of claim 11 wherein the monoalcohol comprises from 1 to 24 carbon atoms, may be linear, branched, or cyclic, and may be saturated or unsaturated, and may be a mixture of such monoalcohols.

13. The method of claim 12 wherein the monoalcohol comprises isopropanol.

\* \* \* \* \*